May 3, 1966 — O. C. AAMOT — 3,249,425
PROCESS FOR FREEZE-REFINING A METAL
Original Filed Oct. 27, 1958 — 5 Sheets-Sheet 1

INVENTOR.
OLAV C. AAMOT, DECEASED
BY RICHARD O. AAMOT, EXECUTOR
BY
Stevens, Davis, Miller & Mosher.
ATTORNEYS May 3, 1966 O. C. AAMOT 3,249,425
PROCESS FOR FREEZE-REFINING A METAL
Original Filed Oct. 27, 1958 5 Sheets-Sheet 2
Fig. 4.
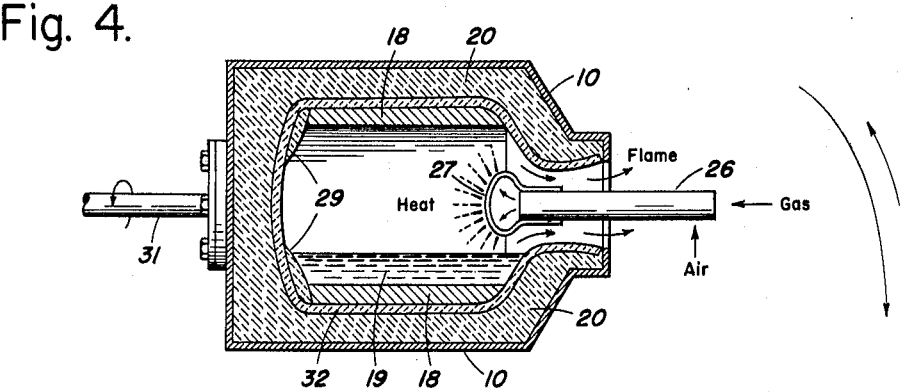
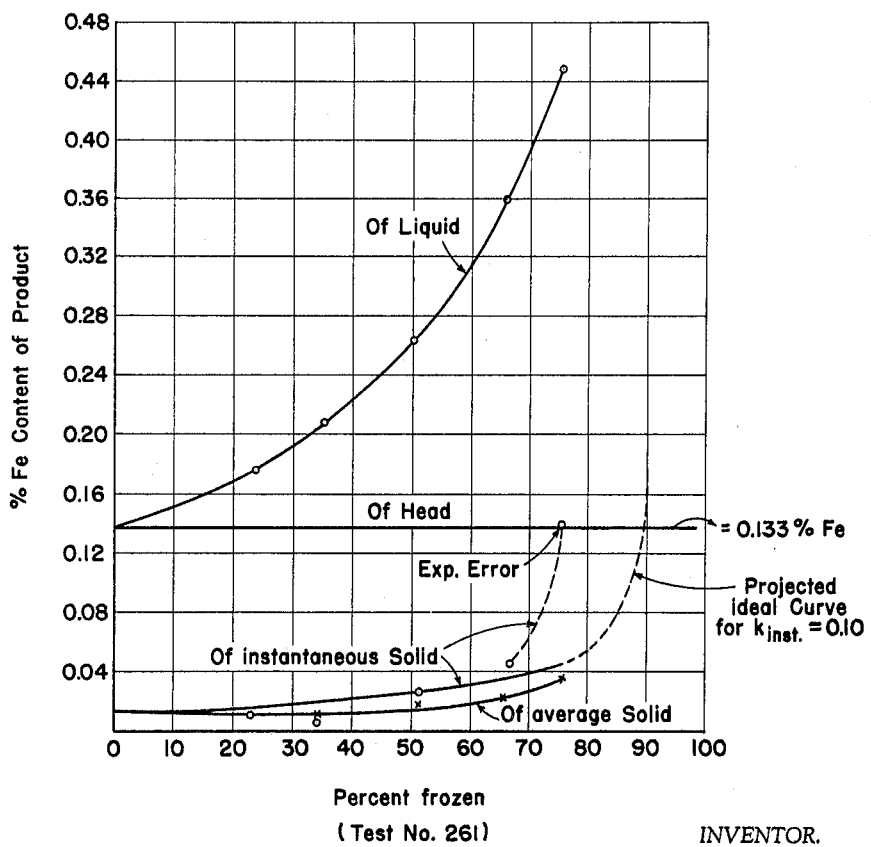
Fig. 5.
(Test No. 261)
INVENTOR.
OLAV C. AAMOT, DECEASED
BY RICHARD O. AAMOT, EXECUTOR
BY
ATTORNEYS May 3, 1966     O. C. AAMOT     3,249,425

PROCESS FOR FREEZE-REFINING A METAL

Original Filed Oct. 27, 1958     5 Sheets-Sheet 4

Stage 1

Derivation of bulk deposited metal for subsequent refining. 33.3% Freeze-out of aluminum from overall liquid burden-repeated twice to amass 15 tons of SOLID-A.

Rotary retort

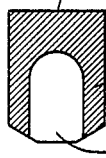

CHARGE: 15 tons raw charge each fill = 45 tons total (0.17% Fe = 99.65% Al)

DEPOSIT: 5 tons SOLID-A (0.024% Fe) each fill = 15 tons total

LIQUID RESIDUE DISCHARGED: LIQUID-A 10 tons (to market as 99.5% metal) each fill (0.24% Fe)

Stage 2

First purification of SOLID-A following re-melting. 75% Freeze out based on total aluminum content.

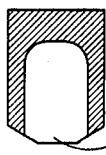

CHARGE: 15 tons of SOLID-A (0.024% Fe)

DEPOSIT: 11.25 tons SOLID-B (0.007% Fe)

LIQUID RESIDUE DISCHARGED: 3.75 tons (recycled to Stage I) (0.07% Fe)

Stage 3

Second purification of SOLID-A via partially purified SOLID-B, following re-melting. 75% Freeze-out.

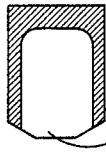

CHARGE: 11.25 tons SOLID-B (0.007% Fe)

DEPOSIT: 8.44 tons SOLID-C (0.002% Fe)

LIQUID RESIDUE DISCHARGED: 2.81 tons (recycled to Stage II) (0.02% Fe)

Stage 4

Third purification of SOLID-A via purified SOLID-C derived from purified SOLID-B 84.5% Freeze-out following re-melting of SOLID-C

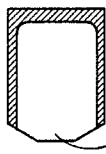

CHARGE: 8.44 tons SOLID-C (0.002% Fe)

DEPOSIT: 7.1 tons SOLID-D of 0.0007% Fe

LIQUID RESIDUE DISCHARGED: 1.34 tons of (recycled to Stage III) 0.007% Fe

Stage 5

Partial melting of SOLID-D for discharge as final product and final melt out of rest of SOLID-D

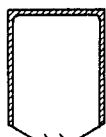

CHARGE: 7.1 tons of SOLID-D of 0.0007% Fe

DEPOSIT: NONE

DISCHARGE: About 5 tons of final purified aluminum of about 0.001% Fe and low in type B impurities DISCHARGE: About 2.1 tons of SOLID-E low type A metal but high in type B impurities

Fig. 7.

INVENTOR
OLAV C. AAMOT, DECEASED
BY RICHARD O. AAMOT, EXECUTOR
BY
*Stevens Davis, Miller & Mosher*
ATTORNEYS United States Patent Office 3,249,425
Patented May 3, 1966

3,249,425
PROCESS FOR FREEZE-REFINING A METAL
Olav C. Aamot, deceased, late of Lewiston, N.Y., by Richard O. Aamot, executor, Seattle, Wash., assignor to Joseph R. Mares, Dickinson, Tex.
Continuation of application Ser. No. 769,868, Oct. 27, 1958. This application Aug. 17, 1964, Ser. No. 391,071
15 Claims. (Cl. 75—68)

This is a continuation of the inventor's copending application Serial No. 769,868, filed October 27, 1958, now abandoned, which, in turn, in a continuation-in-part of my application Serial No. 626,522, filed December 6, 1956, now also abandoned which in turn is a continuation-in part of application Serial No. 440,886, filed July 2, 1954 now abandoned.

The present invention relates to a new and improved metallurgical process. More particularly, the invention contemplates the provision of a novel process for the purification of metals and alloys and, specifically, aluminum, involving treatment of relatively impure charges of such materials by a unique freeze-refining technique.

In the inventor's patent applications, mentioned above, the inventor has described and claimed a process for the freeze-refining of various metals and alloys which involves treatment, in the liquid phase, of the metallurgical charge undergoing refining while confined within a horizontally-disposed, rotating, cylindrical retort, whereby incremental portions of the impure liquid charge are gradually transformed into a purified solid phase. The process of the copending application provides for the establishment and maintenance of intensive agitation between the liquid and solid phases through control of the speed of rotation of the retort to suspend the depositing solid phase increments, as formed, against the outer walls of the retort under action of gravitational and centrifugal forces, whereby the deposited solid phase is caused to be passed repeatedly through the liquid phase which is disposed in pool-like fashion in the lower section of the retort. Heat is supplied continuously to the liquid phase throughout the refining cycle in order to maintain the same at a temperature at least equivalent to the melting point of the depositing solid phase, and ultimate separation and recovery of the purified solid and residual liquid phases is effected by draining the impure liquid phase from the retort while the purified solid phase is continued in suspension against the walls of the retort under action of the forces induced by the rotary motion of the retort.

The present invention is concerned with improvements in the basic freeze-refining technique of my copending application, as applied specifically to aluminum and aluminum alloys. The invention finds general application, however, in the freeze-refining of any solute-solvent system in which there exists a noticeable difference in the concentration of the solute between the solid and liquid phases at equilibrium conditions. By way of illustration, data may be readily ascertained by reference to any of the so-called "binary phase diagrams," in which one metal may be considered the solute and the other the solvent, with the solvent actually constituting the main component of the metals system. In general, the solute metal or alloy component will either function to lower the melting point of the solvent metal component, thereby producing a lower-melting point system, or eutecticum, as, for example, in the system lead-tin, or the solute component will raise the melting point of the solvent component, such as in the system antimony-tin, in which case no eutecticum is formed. In addition to the foregoing phenomena, there exists a third possibility, namely, that in which the respective components are mutually immiscible or not readily soluble in each other. In the latter instance, the separation of two such metals or alloy systems may be effected quite readily as, for example, in the case of the lead-iron system, in which lead may be obtained as a relatively pure by-product in the reduction of lead-containing iron ores. Thus, inasmuch as the iron and lead are not mutually soluble in each other and do not mix to any appreciable extent, the heavier lead component will usually separate out in the form of an independent bottom layer within the smelting unit.

In those situations in which two liquefied metals are only partly soluble in each other, they will usually stratify into two separate layers in which each layer will contain a certain concentration of the principal component of the other layer, in solution with its main component. This situation is found to exist in systems such as lead-zinc, wherein the liquefied zinc layer suspended on top of the heavier liquefied lead, will normally contain approximately 0.7 percent lead dissolved therein. While such a concentration of a contaminating metal component may be considered negligible for many purposes, it represents a formidable task to effect separation of this residual lead content from the otherwise relatively pure zinc. In general, this is customarily done by application of well known distillation techniques to produce an extremely high-purity or premium zinc product (99.99% Zn).

Since most metals in their liquefied state exhibit at least limited solubility towards one or more other metals, it is not at all uncommon to find a principal metallic component contaminated with a variety of impurities. For example, aluminum of relatively high purity will usually contain a plurality of contaminating metals in the form of impurities. These impurities will generally fall into one or the other of the types enumerated before, namely, they will either serve to lower the melting point of aluminum or they will raise its normal melting point. In essence, this means that when aluminum commences to crystallize in solid form from a melt of relatively impure aluminum, those metals or elements which normally lower the melting point of aluminum will enrich or become more concentrated in the residual melt, whereas those metals or elements that raise the melting point of aluminum will be concentrated within the solid or crystal fraction. Considering each such potential impurity, provided there exists a difference in concentration between the solid and liquid phases of aluminum, under equilibrium or ideal conditions with respect to that element, the present invention utilizes this difference to advantage in effecting over-all purification of the parent metal, aluminum.

It will be appreciated that conditions normally attendant to bulk industrial refining operations cannot be expected to be as efficient or ideal as those represented by laboratory-scale operations conducted towards the construction of a phase diagram for a corresponding two or multi-component metals system. Accordingly, as a convenient means for evaluating the degree of perfection attained in bulk refining, one may take the ratio of the percent of a particular impurity contained in an average sample of the whole solidified and refined metal, to the percent of the same impurity contained in the residual impure liquid fraction. This ratio is herein referred to as the average K-factor or the K-factor for the impurity. For those elements which function to lower the melting point of aluminum, hereafter referred to as "Type A Impurities," the K-factor will be less than unity, whereas for those elements which function to raise the melting point of aluminum, hereafter referred to as "Type B Impurities," the K-factor will be greater than unity. The following metals represent the most common Type A impurities found in normal electrolytic, or virgin-grade aluminum metal:

TYPE A IMPURITIES

Iron
Silicon
Copper
Nickel
Magnesium
Calcium
Sodium
Gallium
Boron
Zinc, and
Manganese whereas the following metals represent the most common Type B impurities usually found in such aluminum:

TYPE B IMPURITIES

Vanadium
Titanium
Chromium
Zirconium, and
Molybdenum

The foregoing listings are not intended to be exhaustive, nor do they represent the only impurities which can be removed from aluminum in accordance with the general processing techniques of my invention.

As established in greater detail hereinafter, it is immaterial whether all of the above impurities occur simultaneously in the aluminum metal to be refined, or in various lesser combinations, but it is essential only from the standpoint of the process of the invention that the concentration of any one metal must not be unduly high. In the latter event, a preliminary crude refining operation can be practiced to remove any excess of a particular impurity, following which the freeze-refining technique of the invention can be applied to the semi-refined product.

While trace quantities of virtually all of the aforementioned impurities can be detected in different lots of normal grade electrolytic aluminum, the principal impurities consist of the following metals (Type A) in the approximate concentrations indicated:

| | Percent |
|---|---|
| Iron | 0.06–0.35 |
| Silicon | 0.06–0.25 |
| Copper | 0.01–0.05 |
| Gallium | 0.01 |

In general, the type B impurities enumerated above, i.e., vanadium, titanium, etc., will usually be present in concentrations of the order of 0.01 percent or less. It may be said that electrolytically-produced aluminum metal is viewed as "normal grade" when containing a minimum of 99.5 percent aluminum, whereas high-purity aluminum is generally viewed as containing aluminum in a minimum concentration of 99.85 percent. The latter product is considered to be a premium grade aluminum metal and demands a higher price than the usual normal grade.

In accordance with present commercial practice, by the application of a secondary electrolytic refining of normal grade aluminum metal (Hoopes process), a so-called super-refined metal of 99.99 percent aluminum content can be produced, but the premium charged for this product is quite substantial due to the inherent additional processing required for its production. In addition to the super-pure electrolytic product, it is known that an aluminum of 99.999 percent aluminum content can be obtained by application of so-called "zone refining." The latter process utilizes a molten zone traversing a long, solid ingot of aluminum to flush Type A impurities from the major length of the ingot, concentrating the same at one end thereof and Type B impurities at the other end. It is generally conceded, however, that there is no existing process capable of producing 99.99 percent pure aluminum metal at a cost competitive with that of the aforementioned Hoopes electrolytic refining technique.

The present invention contemplates the perfection of a process whereby super-pure aluminum metal (99.99+ percent Al) can be produced from normal grades of aluminum or even lower grades such as scrap metal, efficiently, economically, and on a tonnage scale. Of course, it will be readily understood that the process is equally applicable to the refining of many other metals and metallic charges, and may be applied, also, to purification problems of a different nature, such as aqueous solutions, waxy emulsions, etc.

As pointed out hereinbefore, my copending application Serial No. 626,522 describes the use of a horizontally-disposed cylindrical retort which is capable of being rotated about its own axis, and eventually inclined to a vertical position for discharge of liquid fractions contained therein. In the use of this retort for refining purposes, the interior of the same is preheated to a temperature above the melting point of the metal to be refined, the unit is then charged with the metal in liquefied or molten form, and rotated under continual application of slow-cooling through the external walls. At the same time, heat is supplied to the interior of the retort while the metal is undergoing refining. As a result, the desired purified metal is progressively deposited out of the liquid melt onto the surface of the internal lining of the retort, such that continual operation of the unit in this manner is effective in building up an accumulated solid layer suspended against the retort lining. It has been demonstrated by actual experimental data set forth in the copending application that metallic tin of especially high-purity can be progressively produced through successive freeze-refining operations performed on the crystallized solid phase recovered from a preceding stage of refining of the same type. In addition, it was further demonstrated that an equivalent purification could be effected by application of this general freeze-refining technique to aluminum metal.

It is a specific object of my present invention to describe further improvements and discoveries relating to the general application of freeze-refining to aluminum metal. In particular, the invention contemplates the provision of an improved refining process which is capable of effecting enhanced purification of aluminum in a more efficient manner than is possible in accordance with the basic processing techniques described in my original application.

The process of the present invention is based, in part, on the observation that considerable oxidation of aluminum occurs during the freeze-refining operation as conducted in accordance with the teachings of my aforementioned application, owing to the relatively high speed of rotation of the retort, which I previously considered essential in order to achieve good refining action. For example, an essential feature of my original process involved the use of an interiorly-disposed gas flame to retard the freezing or crystallization action. While the inventor has found that the use of internal heating is still a prime requisite to the obtainment of good K-factors, i.e., good separation of impurities, the inventor has further observed that there exists a substantial difference in the efficiency of the over-all refining action depending upon the nature, quantum, location and method whereby such internal heating is applied to the charge undergoing refining. By way of illustration, the inventor has attempted many refining operations utilizing an internal heating source consisting of a coaxially-positioned radiant electrical heating element extending along the entire length of the retort, but have found that comparatively poor results are obtained in all instances with this type of an arrangement, whether heat is supplied via an electric element or as a gas flame.

Quite unexpectedly, however, it has been found that substantially improved efficiencies can be obtained when the thermal energy of the internal heating source is supplied principally to the liquid pool of metal, i.e., without supplying any appreciable heat to the remainder of the metal in the retort, other than that required to maintain the ceiling of the retort at a temperature slightly higher than the temperature of the liquid metal, i.e., to prevent undue deposition of metal to occur during the upper arc of the overall-rotational cycle. It is further found that this type of heating can be effected most advantageously by directing the heat towards the inner-frontal refractory cone of the retort in the form of a shielded gas flame, such that these surfaces of the retort absorb the sensible heat of the flame and give it off to the liquid metal during rotation of the retort.

Still further improved results are obtained with an arrangement providing for deflector elements on the rear wall of the retort, whereby the liquid metal can be elevated to promote a forward surge of metal along the up-going side of the retort wall, thereby effectively cross-washing the solid deposit while providing good longitudinal mixing of the liquid metal. This arrangement has been found to be extremely effective in establishing and maintaining an even temperature and composition for the liquid metal while the purified metal is being deposited in stratified manner on the retort wall, in that, the solid deposits are constantly surged through the liquid metal pool during the entire refining operation.

In addition to the foregoing observations, the inventor has found that by applying an inclination or tilt to the retort during the refining operation, a much greater charge of liquid metal can be treated, and the longitudinal mixing action for the liquid metal is much superior to that obtained with the retort rotated in a horizontal plane. Under these conditions, it has been observed that in addition to a strong forward surge of metal on the upgoing side of the retort, a liquid film of metal can be made to spiral on the retort wall from the rear to the front of the retort throughout the refining operation. By way of illustration, as established by the experimental data set forth hereinafter, the tests conducted with the retort operated in a tilted position show a considerable improvement in the K-factor, coupled with an increased capacity which, at an angle of approximately 15° from the horizontal, is almost double the normal retort capacity when operated by rotation in an ordinary horizontal plane.

The inventor has further found that in lieu of the simple refractory lining, a previously deposited coating of high-purity aluminum metal on the walls of the retort forms a much superior surface for promoting growth of the solid phase during the refining operation.

The combination of the foregoing features further demonstrate that the speed of rotation of the retort can be lowered to such an extent that the undesirable oxidation of aluminum metal during the refining cycle is greatly reduced. Additional suppression of oxidation effects can be achieved by utilizing a small amount of salt flux, as for example, a mixture of alkali chlorides, and by maintaining maximum fluidity of the liquid metal at all times through application of the interior gaseous flame source in the manner detailed above. By the addition of suitable vacuum equipment to the retort in conjunction with use of an electric inner-frontal heating element, oxidation can be eliminated almost entirely, and occluded gases in the metal maintained at an absolute minimum.

A significant criterion of successful refining in accordance with the process of the present invention is apparent upon discharge of the residual liquid melt at the end of a particular refining cycle. Thus, when the desired quantity of solid metal has been deposited on the retort wall, the liquid residue must be discharged as a thin flowing metal, free of crystalline growth habit, and containing a minimum of over-lying dross, leaving a hollow cylindrical solid deposit on the retort wall, having an even surface of massive fine-sized crystal habit.

In the application of the freeze-refining process of the invention to vacuum conditions, the inventor preferred to employ a retort of the double open-ended type with the rear opening being connected to the vacuum equipment for exhaust. For open refining, I have used advantageously a single open-ended retort which, as will be readily appreciated, is more amenable to rotation on an axis inclined to the normal axis of the cylindrical retort. In either event, however, I prefer to employ a heating element disposed just inside the front opening of the retort, and consisting of either a shielded gas heater or a short electrical radiant heating element which is inserted after the retort has been charged.

The effective limit of refining for the process of the invention with respect to those elements which lower the melting point of aluminum, corresponds to that of the eutectic concentration of the first element to reach this concentration, usually iron. After this concentration has been reached, further deposition of solid metal will take place under condition of constant composition, namely, metal of the eutectic concentration with respect to iron content, whereas other elements forming eutectics only when much higher concentrations of the same are reached, such as silicon, copper and gallium, for example, will continue to concentrate in the liquid. For example, the eutectic limit for iron in aluminum is 1.9 percent Fe; that of silicon in aluminum is 12.55 percent Si; that of copper in aluminum is about 33 percent Cu; that of nickel in aluminum is about 5.7 percent Ni; etc. Additional eutectic limits for the various impurities listed hereinbefore may be obtained by reference to appropriate phase diagram texts available on this subject, insofar as they are known presently.

In accordance with the binary phase diagram for iron and aluminum, for example, it is not possible to accomplish more than a certain degree of refining for each cycle of operation, and it therefore becomes necessary for the production of super-pure aluminum to repeat the refining cycle several times. That is to say, repetition of the refining operation insures that one will obtain highly purified solid aluminum metal as one end-product, and, for the other, an impure residual liquid metal of composition close to the eutectic limit with respect to the concentration of iron contained therein, since iron will usually be the first impurity to reach near eutectic concentration.

While the process of the present invention requires a plurality of successive refining cycles, it is to be noted that in each such cycle the results obtained are almost equivalent to those which should be obtained under theoretically ideal conditions, i.e., conditions corresponding to those employed in a determination of the melting point curves for the phase diagrams of the corresponding metals. In other words, the K-factor obtained by the refining technique of the invention actually approximates that of the theoretically ideal K-factor as determined from the phase diagrams of the metals involved.

It will be readily apparent that it is essential to any large scale refining operation that the number of refining cycles be maintained at a minimum in order to render the process most economical from the standpoint of consumed energy. To this end, in the refining process of the invention, the deposited solid metal phase accumulated on the retort wall at the end of any refining cycle, is close to its melting point, and may be rendered molten by the simple application of heat energy in an amount equivalent to the heat of fusion of aluminum (approximately 169 B.t.u. per pound of aluminum metal). On the other hand, the liquid residue which is discharged from the retort at the end of each refining cycle will always be close to the required temperature for a subsequent freeze-refining cycle conducted to recover an additional quantity of a slightly less-purified solid phase. Accordingly, it need only be poured into a standby retort preheated to the optimum operating temperature, and sufficient heat supplied to make up radiation losses incurred during the discharge and transfer operations. In essence, therefore, it will be seen that although the process of the invention involves a series of successive refining operations, these are conducted in such manner that an over-all reduced cost of refining is achieved as compared with presently known techniques.

It is believed that the foregoing conclusion may be best understood by a brief description of the purposes underlying the multi-stage nature of my process. Thus, at the inception of a refining operation, the concentration of impurities in the liquid phase will be at an absolute minimum, with respect to content of A-elements, and will increase as the successive cyclic refining continues. This continual concentrating of Type A impurities within the liquid phase will proceed rather slowly at first until such time that approximately half of the original liquid metal has been recovered as the deposited purified solid phase from the retort walls. After the volume of the liquid melt has reached one half of that of the original charge, it will become concentrated with respect to impurities much more rapidly. That is to say, since the concentration of any one impurity in the depositing solid phase can be viewed at all times as a constant fraction of the concentration of the same impurity contained in the liquid phase, the purest solid will be deposited at the beginning of the refining operation, with the concentration of impurities increasing relatively slowly until approximately one half of the original burden has been removed as deposited solid, and then substantially more rapidly as the liquid in equilibrium with the impurities enriches more rapidly with respect to A-impurities.

By way of illustration, the inventor has found that the composition of the liquid melt, again with respect to type-A impurities only, changes only moderately up to a point where approximately one-third of the total available aluminum metal has been frozen out of the liquid phase, and, the initial portions of the deposited solid from this fraction are not appreciably different from the last portions to be deposited out of this initial one-third of the over-all burden. At the half-deposited point, however, the concentration of A-impurities in the liquid phase will be almost twice as high as that of the original total liquid mass, and, in the same manner, at the three-quarter-deposited mark, the liquid phase may be almost four times as impure in A-elements as was the original burden.

On the basis of the foregoing, one may employ an initial retort operated to freeze out approximately one-third of the total available aluminum metal, thereafter passing the residual liquid from that retort to a second retort wherein one-third of the metal remaining in the liquid is frozen out, and, finally, the residual liquid from the second retort is passed into a third retort in which one-third of its residual aluminum content is frozen out. A plurality of retorts can be employed in the initial refining stage to insure adequate charges, in a volume sense, for the second and third stage retorts. Operating in this manner, which I shall term "split freeze-refining," one obtains on the basis of all three solid fractions, approximately 70.3 percent of the over-all aluminum content available for recovery, whereas the final liquid residue from the third stage retort will contain approximately 29.7 percent of the available aluminum. As a net result, the over-all purity of these combined solid fractions with respect to content of A-elements will be substantially greater than that obtainable if the same amount of metal, namely, 70.3 percent by weight, is frozen out of the liquid melt in a single cycle of refining. In addition, the very first solid separated out will contain the bulk of those elements which raise the melting point of aluminum (Type B), and later-deposited solids will have diminishing contents of these impurities. Of course, this technique may be subject to change in accordance with such factors as the degree of purification required, and the over-all economics of any specific operation.

It is believed that the foregoing objects and features of the invention, as well as the invention itself, may be best understood by reference to the following detailed description and experimental data, taken in conjunction with the accompanying drawings, wherein:

FIG. 4 is an elevational section view of the type of tiltable, single open-ended rotary retort used in the experimental tests described hereinafter;

FIG. 5 is a graph illustrating an actual plot of the composition of refined solids as a function of the percentage solids frozen out of solution, and of the corresponding liquid phase in equilibrium with the depositing solid phase;

FIG. 7 is a schematic flow sheet or flow diagram illustrating the multi-stage technique employed to produce super pure aluminum in accordance with my invention.

Figure 1:
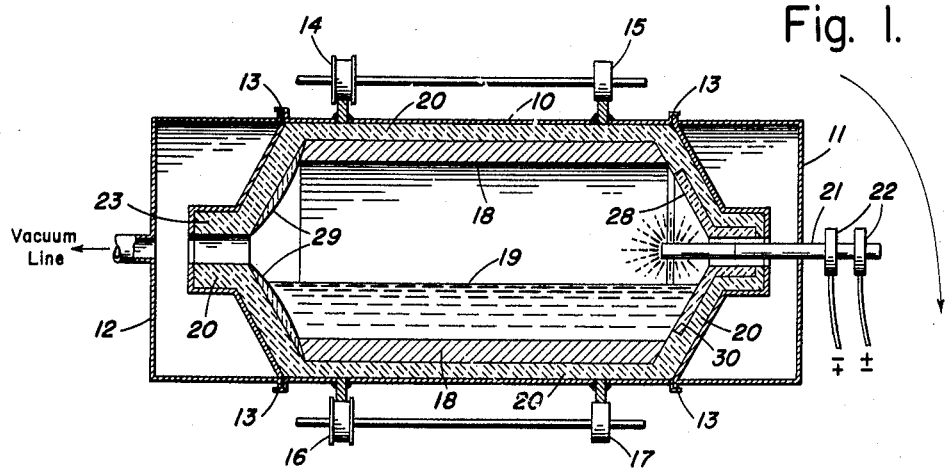
FIG. 1 is an elevational section view of a typical rotary retort used in practicing the process of my invention, and illustrating the associated vacuum metallurgical techniques employed to avoid oxidation of refined aluminum metal.

In general, the rotary retorts used in the practice of my present invention are quite similar to those which have been described in substantial detail within the inventor's aforementioned copending application. With particular reference to FIG. 1 of the drawings, there is illustrated a vacuum-type retort consisting of a substantially cylindrical outer shell 10 of steel or similar material fitted with removable end-sections 11 and 12 which are each adapted to provide air-tight closures in contact with the shell 10 through suitable mated sealing rings or mounting flanges 13 provided around the outer periphery thereof. The retort is adapted to be rotated about its axis by means of the roller-idler system indicated schematically in FIG. 1 by reference numerals 14–17, under action of any suitable prime mover (not shown). As also indicated in FIG. 1, by the curved arrow, the retort is adapted to be tilted forward through a 90° arc for operational efficiency as explained hereinafter, and for discharging products contained therein. Reference numerals 18 and 19 are intended to depict the respective positions of the solid and liquid phases during rotation of the retort about its normal horizontal axis. The interior-facing walls of the retort as well as the removable end-sections are lined with a suitable refractory material 20. The right-hand end 11 of the retort contains an electrically heated resistance rod 21 projecting into the retort a limited distance and supplied via the slip-ring brushes 22. The opposite end of the retort is provided with a suitable connecting port 23 communicating with the interior of the retort for applying vacuum conditions to the retort during the refining cycle.

The retort illustrated in FIG. 1 is particularly suited for use in refining operations in which complete avoidance of oxidation must be maintained for the aluminum metal undergoing refining. In addition, with a condenser attached to the retort in the manner described in my co-pending application Serial No. 440,886, the unit may be employed to distill out any contaminating metals of the type of zinc and/or magnesium which might otherwise interfere with the normal refining operation when present in excessive amounts within the raw charge material, i.e., scrap aluminum, etc. Refining of aluminum metal under vacuum also serves to remove dissolved gases, and particularly hydrogen, thereby providing for the production of substantially non-porous refined metal.

Figure 2:
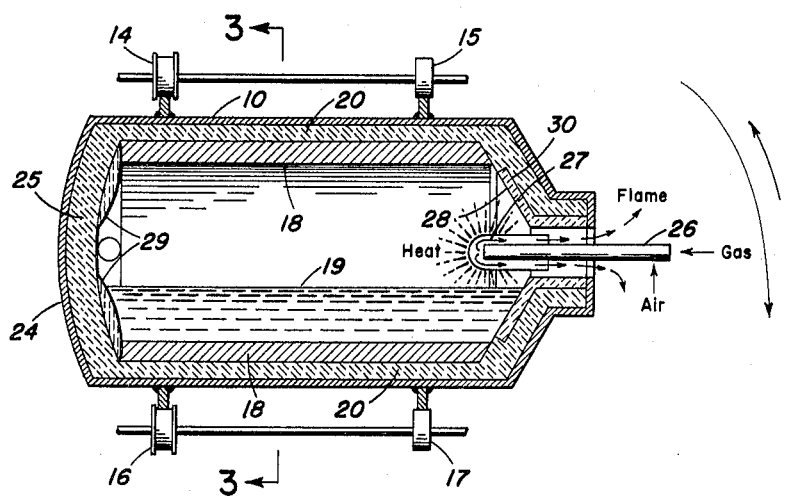
FIG. 2 is a similar elevational section view of a tiltable, single open-ended rotary retort illustrating the associated gas-fired heating element and deflector mantle in preferred operating position therein.

With reference to FIG. 2 of the drawings, the inventor has illustrated a single open-ended retort in which like elements are designated by the same reference numerals as assigned hereinbefore with respect to FIG. 1. In the retort of FIG. 2 one end of the retort is closed by a steel plate 24 and refractory liner 25 similar to the shell and lining 10–20 utilized throughout the remainder of the retort. In general, the refractory lining 25 at the retort end is somewhat heavier than that required on the cylindrical wall surfaces of the retort. The entire lining may be suspended from the retort shell by suitable hangers such as a heavy mesh steel net or the like which is in turn welded to the external shell.

In the retort of FIG. 2, the heat input required during the refining cycle is obtained by means of a gas-fired burner 26 which projects into the end of the retort and fires against a suitable deflector mantle 27 serving to expel gases of combustion out of the retort as illustrated by the small arrows in FIG. 2. Of course, the retort of FIG. 2 may also be equipped with an electrical radiant heating element similar to that illustrated in FIG. 1, the principal objective being in either case to obtain uniform heating of the inner frontal refractory surfaces of the retort as designated generally by reference numeral 28 in FIGS. 1 and 2, and ultimately, heating of the liquid metal pool by contact with said refractory surfaces during rotation of the retort. The inner frontal conical part of the refractory 30 may be made of special heat conductive material, such as Carborundum, to facilitate absorption of heat by the heat source as well as to conduct heat faster over the whole conical frontal part.

Figure 3:
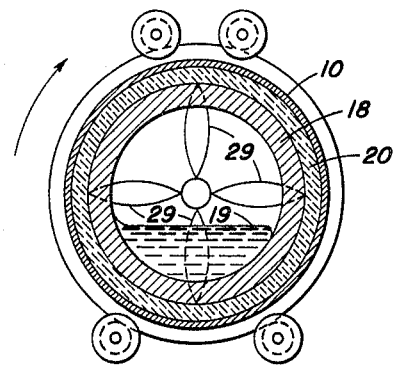
FIG. 3 is a sectional end view of the retort illustrated in FIG. 2 taken along the line 3—3 of FIG. 2, and illustrating the refractory lifters utilized to secure more efficient longitudinal mixing of a liquid charge contained in the retort. This view is equally illustrative of a similar section taken through the retort shown in FIG. 4 of the drawing.

Both the retorts of FIGS. 1 and 2 are equipped with deflector or lifter elements 29, incorporated in the lining on the rear walls of the retorts for purposes of producing longitudinal stirring of the liquid phase with accompanying evenness of composition and heating in this phase. The arrangement of these deflectors may best be seen by reference to FIG. 3 of the drawings. In general, the deflectors consist of refractory projections formed in substantially propeller-like configuration and radiating outwardly from the center of the rear wall. In essence, these elements serve much the same function as ordinary impeller blades within a mixing device, since they are moved with respect to the liquid phase upon rotation of the retort and tend to agitate the liquids in a longitudinal direction throughout the refining cycle. The retort shown in FIG. 2 is tiltable, upwards as indicated by the reverse arrow, as well as forwards; the tilting mechanism not being shown.

In FIG. 4 there is illustrated the modified single open-ended type of retort which was employed in the experimental tests described hereinafter. This unit is provided with a single axially-mounted drive shaft 31 which is fixed directly to the outside of the rearwall of the retort for purposes of facilitating operation of the retort at various inclinations and rotational speeds. This experimental retort could be tilted upwards also, as indicated by the arrows in FIG. 4, to a 12.5° angle with the horizontal. The lining of the retort is similar to that illustrated in FIGS. 1 and 2 except that an inner refractory lining of asbestos cement 20 is coated with an outer refractory lining 32 of Alundum or an equivalent material. In actual practice with this retort, a Monel metal deflector 27 was used in combination with a gas-fired heating source to derive the desired inner frontal heating effects.

With reference to the flow sheet of FIG. 7, the inventor has indicated by means of schematic retorts in combination with typical charge compositions, the technique employed in producing super-pure aluminum metal via a multi-stage refining operation conducted with the progressively purer solid phases recovered from preceding stages of refining. Thus, the initial stage of the cyclic operation is utilized to produce the bulk deposited metal to be refined in the subsequent stages of the process, whereas the discharged residual liquid phase from each stage of refining from the second stage on may be recycled for use in similar retorts appropriately spaced in time sequence from the first retort. In essence, as may be seen by reference to the charge data shown on the flowsheet, the intermediate deposited solid phase designated as Solid-D (Stage 4) is substantially free of iron and related impurities (Type A) which tend to lower the melting point of aluminum. On the other hand, this metal will contain a relatively high concentration of Type B impurities such as titanium, vanadium, and other metals which tend to raise the melting point of aluminum, but these elements are already concentrated into the first part of the solid deposit, and by melting out the last deposited solid product of Solid-D at this point in the cycle, this product recovered from the partial melt-up operation (Stage 5) becomes the final super-pure aluminum desired, whereas the residual solid deposit, now called Solid-E, functions as a collector for Type B impurities. It should be understood, that in some cases only two stages of purification performed on the bulk deposit from the first stage refining may be sufficient to produce aluminum metal of 99.99% purity. This depends directly on the type of raw material used for supply purposes, i.e., the quantum and nature of the impurities contained within the aluminum metal charged to Stage 1 of the cycle.

Figure 8:
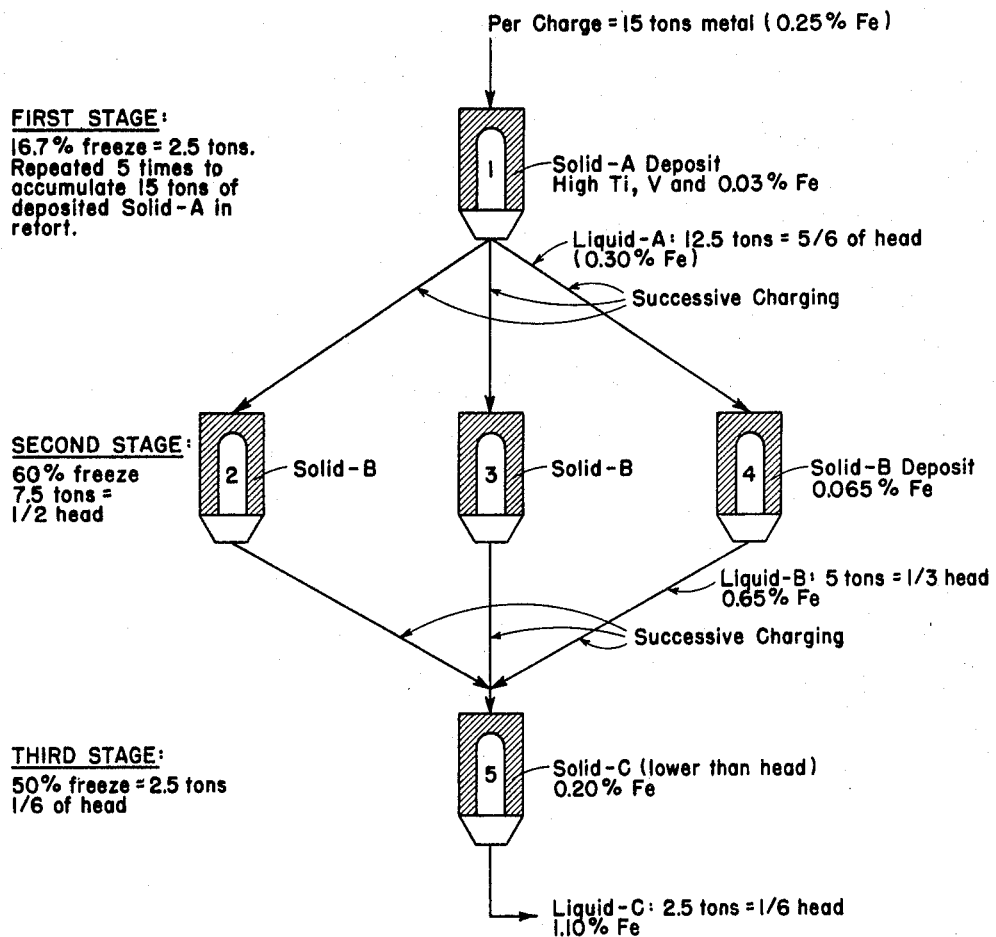
FIG. 8 is a schematic flow diagram illustrating an example of the split freeze-refining technique of my invention as described in greater detail hereinafter.

With reference to FIG. 8 of the drawings, the inventor has shown in schematic flowsheet form a technique utilizing the basic principles of my invention which is hereinafter referred to as split freeze-refining. The retorts illustrated in FIG. 8 may all be viewed as being equivalent to the Stage-1, or bulk loading retorts of the multistage refining process shown in FIG. 7, as will appear more clearly from the following description of the intended operation of this system.

All five of the retorts illustrated in FIG. 8 are of equal capacity and all have the same freeze-refining capacity on an hourly basis. Thus, assuming for a maximum bulk charge of 15 tons, retort No. 1 in FIG. 8 will freeze-out 2½ tons of solid in 2½ hours, or at a rate of 1 ton per hour. This represents one-sixth of the incoming charge, or so-called "head metal" to that retort. The residual liquid, 12½ tons of metal from retort No. 1 is then supplied, at the end of 2½ hours of freeze-refining, to retort No. 2, for example, which constitutes one of a group of three retorts (Nos. 2, 3 and 4) all operated, in turn, on liquid feed from retort No. 1. These retorts will function to freeze more metal out of the liquid feed derived from retort No. 1, such that in 7½ hours a deposit of 7½ tons should be accumulated in these retorts, assuming continuous operations, and the residual metal discharged from each into retort No. 5 will be 5 tons. Accordingly, each of the 2, 3 and 4 retorts effects approximately 60% freezing-out of their charges, or ½ of the over-all head metal forming the original charge.

Retorts 2, 3 and 4 are spaced on 2½ hour lead-times with respect to each other, such that retort No. 1 is fully occupied in servicing one of these retorts each 2½ hours. Assuming, as stated above, that each retort has a storage capacity of 15 tons of deposited solid metal, following two cycles of refining on material supplied from retort 1, each of retorts 2, 3 and 4 will be fully loaded with 15 tons of metal. Whenever a retort reaches its capacity in this manner, it is then started on a refining cycle as outlined in FIG. 7 to further refine this 15 tons of partially purified metal. That is to say, retorts 2, 3 and 4 of FIG. 8 successively become Stage 2 retorts within the system of FIG. 7 working towards the production of Solid-B metal.

Retort 5 is supplied with the liquid residue, in turn, from each of retorts 2, 3 and 4, and functions to freeze-out from these 5 ton increments, one-half of the available 5 tons, or, one-sixth of the original charge to retort No. 1. This retort will discharge on 2½ hour cycles, a final impure liquid which also represents one-sixth of the original head metal (2½ tons). If desired, a sixth retort can be added to the system to further concentrate the liquid discharge from retort No. 5 into a still higher and more nearly eutectic liquid product. This retort could, in turn, be supplied also with the return liquids discharged from the other retorts later in the cycle.

It will be seen that in sequential order, retort No. 2 will be the first to attain its capacity of 15 tons of solid deposit, followed by retort No. 3, then Nos. 1, 4 and 5, in that order. At this point, i.e., with all retorts carrying 15 tons of frozen-out solids, the following will have been accomplished:

Retort No. 1 will contain metal which is high in Type B impurities, but substantially free of Type A impurities.

Each of retorts Nos. 2, 3 and 4 will contain metal which is of uniform composition, low in Type B impurities, but containing Type A impurities in slightly higher concentrations than the metal in retort No. 1.

Retort No. 5 will contain metal which is free of Type B impurities, but which is almost as impure as the head metal with respect to Type A impurities. At the same time, the ultimate liquid residue recovered from retort No. 5 will be concentrated to a high degree in Type A impurities, and may be further refined to reach a near eutectic concentration with respect to iron, for example. Following this, the liquid may be subjected to a separate treatment for iron removal, and gallium concentration as described hereinafter, such that more aluminum metal may be eventually recovered from it. Other Type A impurities, and notably gallium, will be more and more concentrated in this product, along with silicon, copper, etc.

It is believed that the invention may best be understood by consideration of the following actual applications of the foregoing principles and procedures to the refining of aluminum metal. In these operations, the inventor employed a cylindrical retort similar to that illustrated in FIG. 4. The retort shell, formed of ⅛ inch steel plate, measured 14½" outside diameter by 15" in length. It was fitted with closely-spaced small iron L-hooks mounted on the interior surface of the cylinder, and projecting inwardly about ¾", which served as anchors for an initial layer of asbestos cement of about 1½" thickness. The frontal opening in the retort measured about 3" in diameter, and was adapted to receive small aluminum ingots for a total charge of about twenty (20) pounds of molten aluminum metal. The melting was achieved by insertion of an airblast-butane gas burner. The retort was arranged to rotate about its own axis and could operate in a horizontal position or in an upwardly tilted position, at angles up to 12½ degrees from the horizontal. The speed of rotation was controllable within the range 25–131 r.p.m., corresponding to peripheral speeds of the inner cylindrical wall within the range of from 1.0 to 5.6 feet per second. For discharge purposes, the retort could be tilted into a full vertical position.

In the experimental refining runs, the retort was suitably pre-heated to a red heat, and thereafter the appropriate charge of aluminum ingots was inserted and melted down to liquid metal by means of the butane gas burner. For a normal charge of about 20 pounds of aluminum, it was found that the gas burner could reduce the metal to the liquid state in about 45 minutes. During the melt-down a small amount of oxide dross was usually formed, and this was skimmed off before the refining cycle was commenced. The temperature of the molten metal was thereafter adjusted fairly close to its melting point, and the retort set in rotation, such that natural cooling, principally through the retort walls, effected freezing-out of metal adjacent the walls.

In the initial test runs, the results of which are presented in tabulated form in Table I below, no internal heating was employed, but rather, the retort was closed to ingress of air during the actual freeze-refining by means of a thin steel cover provided with a central opening for insertion of a gas pipe adapted to introduce a protective mantle of methane or butane gas. The steel cover was fitted relatively loosely over the front end of the retort, such that gas escaping from the interior of the retort could be burned exteriorly of the same.

By withdrawing the gas pipe and the steel cover, it was possible to observe the over-all refining action, effect temperature measurements, and generally determine the appropriate time for discharge of the residual liquid phase. It was found that when the retort was set in rotation at a speed of the order of 98 r.p.m., and adjusted to a temperature of about 20° C. above the melting point of the aluminum, a thin liquid film of aluminum was picked up immediately by the refractory walls, whereas the bulk of the liquid phase formed a pool in the bottom of the retort. This pool was continually agitated with a sloshing motion, principally in a transverse direction. At the up-going side of the retort, the metal pool is lifted and gradually recedes in wave-like motion, whereas at the down-going side of the retort the liquid is depressed slightly due to the drag-action of the retort wall passing through it. In essence, however, the surface of the liquid pool remains substantially horizontal. When freezing commences, the film carried on the retort wall demonstrates a diffuse reflection, rather than a mirror-surface reflection, with lines appearing in the form of liquid ridges which constantly change position in a longitudinal direction. Some liquid drips from the ceiling of the retort indicating that the liquid film has a tendency to contract into ridges, probably due to the high surface tension of aluminum resisting the spread of a thin film over the complete surface area of the aluminum carried on the walls. An oxide film follows and is lifted off on the metal pool and dragged across the pool, taking with it dross particles through the upper swing of the retort. After the initial solid coat of aluminum metal is deposited on the wall of the retort, the freezing proceeds smoothly and the level of the liquid phase begins to drop. Unless heat is supplied to the interior of the retort during this stage in the over-all refining cycle, crystals will develop in the liquid, since the temperature tends to stabilize at the natural melting point of the metal due to the intimate and extensive agitation of the solid phase through the liquid phase. In addition, it is believed that many crystals are actually torn off the retort wall due to this agitation, particularly during the initial phase of the refining cycle where the crystalline growth habit on the refractory wall is relatively weakly bonded, and the physical strength of the thin solid layer is low due to its heated condition. Under these circumstances, the crystals in the liquid phase will tend to multiply rapidly and increase in size, since the cooling action functions at a relatively constant rate. The only metal which will attach itself to the retort wall will then be that crystallizing from the rapidly enriching (A-impurities) liquid phase, in that, the larger crystals formed in situ within the liquid phase are unable to be attached to the wall firmly enough to resist the impact of the washing action produced when they again strike through the liquid pool upon rotation of the retort.

By reference to the tabulated data presented in Table II below, there is shown the comparative results of a series of runs conducted with use of gas-flame heating supplied to the general interior of the retort during the freeze-refining cycle. This heat-input functions to delay freezing, thereby permitting buildup of a multilayer of extremely thin crystalline deposits on the retort wall, and to decrease the undesirable formation or accumulation of crystalline growth habit within the liquid phase. It is to be noted that no flux was used in conjunction with the tests tabulated in Tables I and II. The concentration of iron was studied preliminarily, since iron is generally the predominant impurity in aluminum and therefore the most important from the standpoint of control and removal.

*Table I*

NO INTERNAL HEATING

Freezing Time: Approximately 18-22 minutes.
Speed of Rotation: Varied.

| Test No. | Speed (r.p.m.) | Weight (lbs.) | | | Percent Fe | | | Percent Frozen of Total | K-factor, sol./liq. |
|---|---|---|---|---|---|---|---|---|---|
| | | Chg. | Sol. | Liq. | Chg. | Sol. | Liq. | | |
| 1 | 52 | 22.0 | 12.0 | 10.0 | .67 | .45 | .76 | 31 | .592 |
| 2 | 52 | 21.0 | 12.0 | 9.0 | .64 | .50 | .83 | 57 | .60 |
| 3 | 79 | 20.0 | 10.0 | 10.0 | .53 | .29 | .77 | 50 | .378 |
| 4 | 98 | 21.0 | 11.0 | 10.0 | .56 | .34 | .80 | 52.1 | .421 |
| 5 | 131 | 17.5 | 7.5 | 10.0 | .65 | .55 | .73 | 40.5 | .760 |

*Table II*

INTERNAL HEATING

Freezing Time: 35-45 minutes.
Speed of Rotation: 98 r.p.m. (constant).

| Test No. | Speed (r.p.m.) | Weight (lbs.) | | | Percent Fe | | | Percent Frozen of Total | K-factor, sol./liq. |
|---|---|---|---|---|---|---|---|---|---|
| | | Chg. | Sol. | Liq. | Chg. | Sol. | Liq. | | |
| 6 | 98 | 18.0 | 8.0 | 10.0 | .47 | .15 | .73 | 44.4 | .207 |
| 7 | 98 | 20.0 | 10.5 | 9.5 | .57 | .26 | .91 | 52.5 | .288 |
| 8 | 98 | 19.5 | 11.5 | 8.0 | .47 | .19 | .86 | 59.0 | .218 |
| 9 | 98 | 20.0 | 11.0 | 9.0 | .21 | .07 | .38 | 55.0 | .20 |
| 10 | 98 | 18.5 | 11.0 | 7.5 | .13 | .07 | .23 | 59.5 | .28 |

The above runs were conducted with wire scrap metal containing, in part, some iron cores, which accounted for certain variations in the iron content for the respective batches. The sequence of operations with respect to upgrading the original scrap was as follows:

Tests Nos. 1-6 Primary refining of crude or head metal.
Tests Nos. 7-8 Refining of solids from Tests Nos. 1-5.
Test No. 9 __ Refining of solids from Tests Nos. 7-8.
Test No. 10 __ Refining of mixed solids from Tests 6 and 9.

The iron analyses contained in Tables I and II are those of permanganate titrations, including reduced iron and other metals such as titanium and vanadium which, however, proved to be absent in this particular metal.

The solids from Tests Nos. 9 and 10 were also subjected to spectrographic analysis, and the following results obtained:

SPECTROGRAPHIC ANALYSIS

| Test No. | Percent Si | Percent Fe | Percent Ca | Percent Mg | Percent Cu | Percent Ti | Percent V |
|---|---|---|---|---|---|---|---|
| 9 (Solid) | .02 | .02 | X | P | .02 | P | P |
| 10 (Solid) | .03 | .03 | X | P | .02 | P | P |

X=Not detected at .001%.
P=Present but less than .005%.

It may be concluded on the basis of the foregoing tests that the application of internal heat brought about substantially improved results and, in fact, virtually cut the K-factor in half. Thus, in the initial tests conducted without internal heating, the liquid discharged was, without exception, a thick, crystalline, semi-liquid mass, and in the case of Test No. 4 it was discharged in the form of a dough-like ball under conditions which changed so rapidly that just a few minutes before discharge from the retort the liquid had not been of such consistency. In the case of Tests Nos. 6-10, in which internal heat was applied, the residual liquid discharge was substantially more fluid in all cases, although it still contained some crystalline growth habit and some dross, probably due to oxidation resulting from the presence of water vapor in the combustion gases from the burner.

In an effort to reduce oxidation effects while still maintaining the relatively high rotational speed of 98 r.p.m., which was initially thought to be necessary for the obtainment of good K-factors, the inventor next resorted to internal electric heating utilizing a resistively-heated filament contained within a protective tube of graphite which extended along substantially the entire axial length of the retort. It was considered that this form of heating would permit an accurate determination of the quantity of heat required to achieve the desired results detailed hereinbefore. A transite disc was employed to permit closure of the frontal opening in the retort. The electric heating element was centered through the transite disc, which was in turn provided with a small opening for insertion of a thermo-element to permit regular temperature measurements. In addition, a gas pipe was mounted in the assembly centered below the graphite tube to permit introduction of a protective mantle of dry methane gas into the retort, with the gas being permitted to burn outside the retort during the refining operation.

In these tests, the relatively crude metal was heated and drossed initially, and rotation was then commenced with the metal maintained about 50° C. above its melting point. The electric heating element was then energized and the run continued until the desired amount of refined metal was solidified against the retort walls. In preliminary runs under these conditions, the amount of power supplied to the resistive filament was increased successively from about 800 watts up to approximately 2100 watts, which proved to be too much heat, with 1900 watts seemingly representing optimum power input and permitting a reasonable rate of freezing out the solid deposit. On the other hand, however, it was observed that the liquid metal still contained crystals upon discharge from the retort.

The results of these tests are presented in tabulated form in Table III below. It is to be noted that the aluminum metal used in these tests proved to contain a fair amount of titanium and vanadium, which appeared, in particular, when the initial solid deposits were subjected to further refining for enhanced purity. Of course, this caused some interference with the otherwise quite dependable relative method of analysis by the permanganate technique.

*Table III*

INTERNAL ELECTRIC HEATING

Speed of Rotation: 98 r.p.m.
Freezing Time—varied as indicated.
Head Metal: 100 lbs. 99.8% virgin aluminum.

| Test No. | Mins. Freeze | Chg. | Sol. | Liq. | Chg. | Sol. | Liq. | Percent Frozen of Total | K-factor, sol./liq. |
|---|---|---|---|---|---|---|---|---|---|
| 17 | 39 | 19.5 | 9.0 | 10.5 | .14 | .06 | .22 | 46.1 | .27 |
| 18 | 45 | 18.5 | 11.0 | 7.5 | .19 | .11 | .31 | 59.4 | .35 |
| 22 | 40 | 20.25 | 8.0 | 12.25 | *.13 | *.17 | *.10 | 39.5 | *1.76 |

It should be noted that Tests Nos. 17 and 18 were conducted as primary refining operations, i.e., on head metal, whereas Test No. 22 was effected in conjunction with metal equivalent to Solid-B of the flow sheet of FIG. 7 such that the deposited solids recovered from the latter test consisted of metal equivalent to Solid-C of FIG. 7. The permanganate analysis marked with an asterisk in Table III reflect the error due to the titanium and vanadium contents of the metal undergoing analysis. The tabulated data presented below represent the spectrographic analytic results obtained with the metal from Test 22 as compared to the head metal:

SPECTROGRAPHIC ANALYSIS

| Material | Percent Si | Percent Fe | Percent Ca | Percent Mg | Percent Zn | Percent Mn | Percent Cu | Percent Ti | Percent V |
|---|---|---|---|---|---|---|---|---|---|
| Head Metal | .06 | .10 | X | P | P | P | P | .007 | .02 |
| No. 22 (Solid-C) | .01 | .06 | X | P | P | .005 | P | .04 | .07 |

X = Not detected at 0.001%.
P = Present but less than 0.005%.

It may be concluded from the foregoing results that only slight elimination of iron was effected, whereas the elimination of silicon was quite good, and both titanium and vanadium were considerably concentrated in the Solid-C metal. The input of electrical heat energy, representing approximately 1900 watts, was equivalent to about 38.5 pounds of melted aluminum per hour, assuming that only the heat of fusion, or 169 B.t.u. per pound was needed to effect the necessary melting. Since the natural freezing rate was approximately 35 pounds of metal per hour, as indicated by the results tabulated in Table I, i.e., without application of internal heat, it would appear that with the electrical energy supplied an average of approximately 13.5 pounds per hour was the actual freezing rate obtained. That is to say, about 56% of the supplied heat was utilized for useful purposes.

In many other tests, again resorting to an interiorly burning gas flame for additional heat, it was confirmed that in general a K-factor of about 0.20 could be obtained for iron, but considerable dross was made and results were quite erratic at times.

On the basic of the observations made with respect to the foregoing tests, as well as the general principles underlying the freeze-refining technique of my invention, it appeared as a theory that the uniform distribution of heat energy within the retort would actually serve to defeat the freeze-refining action. An entirely different principle would be to restrict the application of the heat energy to the inner-frontal portion of the refractory lining which in turn would serve to effect more efficient and selective heating of the liquid metal since the metal is contacted directly and bodily with this portion of the refractory lining during rotation of the retort. In theory, such an arrangement would serve to reserve the cylindrical wall surface of the retort for the accommodation of the depositing solid phase.

To the foregoing end, the retort was modified to provide an open end having the butane gas burner inserted a limited distance inside this end of the retort. In addition, a metallic shield was provided at the tip of the burner to deflect the burner flame outwardly towards the inner surface of the conical front end, thereby serving to repel most of the combustion gases outwardly through the charge opening, while at the same time maintaining this opening sufficiently heated to insure that no metal would freeze thereon during discharge of the retort.

In addition to the foregonig modifications, the refractory lifters (reference numeral 29, FIGS. 1, 2, 3 and 4) were added to the rear refractory wall of the retort. As explained hereinbefore, these consisted essentially of a plurality of refractory projections cemented to the normal lining for purposes of including continual longitudinal mixing of the liquid phase. It was considered that this mixing action would insure that the liquid metal would be uniformly contacted against the heated frontal portions of the retort even when this phase became the relatively minor part of the overall retort contents. Lastly, it was found that the addition of a small amount of a solid flux prior to commencing the rotary motion of the retort served to minimize oxidation effects to insignificant values in terms of the overall refining action. In particular, the inventor found that a flux consisting of approximatley equimolar parts of sodium chloride and potassium chloride with approximately 5 to 10% by weight of lithium chloride added thereto serves admirably for the purpose intended. This flux was generally added to the metal in an amount equivalent to approximately 20 grams after skimming off the usual oxide dross. The flux, having a melting point well below that of aluminum metal, melts immediately and slowly distributes itself over the entire exposed surface of the liquid phase. It was subsequently found that in operations in which a more liberal use of these salt fluxes was made, such as 20 grams, initially, followed by four to six additions of about 10 grams each during the freezing cycle, greatly improved separation of Type B elements (titanium, vanadium and zirconium) was obtained in the resulting solid. Apparently, the salt flux reacts slowly with the liquid aluminum thereby forming aluminum chloride which vaporizes out of the retort. At the same time, there is nitrogen present, as verified by the dross formed during refining which invariably contains nitride of aluminum. Seemingly, a beneficial separation of the B-elements into the solid is hastened and improved under these conditions, in that, it is known, for example, that chlorine and nitrogen is effective in removing titanium from impure aluminum. Surprisingly enough, it was further found that the flux had a beneficial action in seemingly serving to increase the wetting and spreading action of the initial liquid metal film against the wall surface of the retort. In other instances, the inventor also employed a commercial flux consisting of magnesium chloride, potassium chloride, calcium chloride, and a very small amount of calcium fluoride (Dow Flux No. 230) with good results.

The combined modifications detailed above served to enhance the overall refining action substantially, and, in tests conducted under these conditions, up to 87% weight of the total liquid phase was successfully deposited upon the retort walls, with 13% by weight of the total charge being discharged at the end of the refining cycle in the form of a thin-flowing liquid residue free of crystalline growth habit and containing only small amounts of oxide dross.

Following a series of preliminary runs to adjust to the modified operating conditions, controlled runs were conducted towards up-grading a quantity of aluminum wire scrap, considered high-grade in terms of scrap specifications, but containing only 99.52% aluminum. A series of five preliminary refining cycles was conducted on the head metal to derive an initial deposited Solid-A, after which this solid was subjected to a secondary refining cycle to derive a Solid-B, which was refined to the Solid-C state, and again refined to the Solid-D state. In these instances, the liquid residues were not returned to the system. This type of operation may be termed refining of "solids from solids," with no regard for return of liquid fractions. The resulting metal samples were analyzed spectrographically, yielded the following results:

As may be seen by reference to the progressive refining action illustrated in the foregoing table, the process of the invention is capable of reducing an initial iron content of 0.24% in the head metal to a residual content of 0.002% in the Solid-D product which contains about 99.98% Al. In addition, most of the other Type A impurities are eliminated to a similar extent, whereas the Type-B impurities are concentrated in the Solid-D metal to such an extent that they must be purged therefrom to produce ultra-pure aluminum metal.

Following the test runs tabulated in Table IV above, which were conducted at a retort speed of 98 r.p.m., two additional tests were conducted as shown in Table V below, at a reduced retort speed of 52 r.p.m. It was found that the lower speed of rotation resulted in considerably less oxidation of the aluminum metal.

*Table V*

Heating: Inner-frontal with deflector shield.
Metal: Composite.
Speed of Rotation: 52 r.p.m.

| Test No. | Weight (lbs.) | Type A Impurities, percent | | | | Type B Impurities, percent | | |
|---|---|---|---|---|---|---|---|---|
| | | Cu | Fe | Si | Ga | Ti | V | Zr |
| 147 | Charge (18.75) | .028 | .143 | .09 | .017 | .0007 | .0007 | .002 |
| | Solid (12.50) | .014 | .044 | .035 | .009 | .001 | .001 | .003 |
| | Liquid (6.25) | .057 | .34 | .20 | .003 | .000 | .000 | .000 |
| | K-factors | .25 | .13 | .18 | .27 | Indef. | Indef. | Indef. |
| 150 | Charge (19.25) | .0017 | .006 | .007 | .0019 | .007 | .009 | .004 |
| | Solid (12.75) | .000 | .001 | .002 | .001 | .010 | .014 | .006 |
| | Liquid (9.50) | .005 | .016 | .018 | .004 | .000 | .000 | .001 |
| | K-factors | Indef. | .062 | .11 | .25 | >10 | >14 | -------- |

By direct comparison of the data tabulated in Table V with those tabulated in Table IV, it may be seen that the reduced retort speed also results in substantially improved K-factors. It may be concluded, therefore, that the agitation and associated refining action achieved at a retort speed of approximately 52 r.p.m. represents nearer to optimum conditions of operation, in that the lower speed seemingly enhances the separation of impurities and in particular, Type B-impurities. The freezing time for Test No. 147, in Table V was 58 minutes, whereas for Test No. 150 it was 100 minutes, corresponding to freezing rates of 12.9 pounds per hour and 7.6 pounds per hour, respectively.

Quite accidentally, following conclusion of the test runs detailed above, and by reason of an attempt to offset a reduced retort capacity caused by uneven relining of the retort, it was found that further improved refining action could be obtained when the retort is operated in a position inclined to its normal rotational axis. In particular, it was observed that under these conditions, the greater depth of the pool of liquid metal accumulated in the rear of the retort effects substantially improved longitudinal mixing of the metal, serving to induce a spiraling liquid film of metal extending from the

*Table IV*

Heating: Inner-frontal with deflector shield
Speed of Rotation: 98 r.p.m.
Head Metal: 115 lbs. wire scrap aluminum.

| Test No. and Start Mat. | Weight (Lbs.) | Type A Impurities, percent | | | | Type B Impurities, percent | | |
|---|---|---|---|---|---|---|---|---|
| | | Cu | Fe | Si | Ga | Ti | V | Zr |
| 92–96 (Avg. of 5 runs from headmetal). | Charge (15.17) | .06 | .24 | .12 | .019 | .0006 | .0003 | .0018 |
| | Solid-A (8.42) | .029 | .080 | .050 | .010 | .001 | .001 | .003 |
| | Liq. A (6.75) | .11 | .47 | .22 | .031 | .000 | .000 | .000 |
| | K-factors | .26 | .17 | .23 | .32 | Indef. | Indef. | Indef. |
| 98–100 (Avg.—from Solid-A). | Solid-B (13.75) | .013 | .126 | .022 | .005 | .002 | .002 | .004 |
| 101–102 (Avg.—from Solid-B). | Solid-C (12.50) | .004 | .007 | .009 | .003 | .002 | .003 | .003 |
| 103 (From Solid-C) | Solid-D (13.75) | .001 | .002 | .004 | .002 | .002 | .003 | .006 |

Note.—Return Liquids not shown.

rear to the front of the retort. Apart from the superior separatory action obtained with the retort operated in this manner, the capacity of the retort is greatly increased, to the extent that at a tilt of approximately 12½° from the horizontal, the overall capacity is almost double that of the normal capacity with the retort operating in a horizontal position. Additional runs were conducted on the basis of this innovation utilizing head metal consisting of 200 pounds of individual 6-lb. ingots of so-called normal electrolytic aluminum. The results of these runs are presented in tabulated form in Tables VI and VII below, wherein all of the analyses were effected by spectrograph techniques:

By reference to the foregoing analytical data, it will be seen that Solid-C is almost free of Type A-impurities, but is relatively high in Type B impurities, and this is also the case for the Solid-D product derived from the original liquid fractions, but to a somewhat lesser extent, in that, the primary separation resulted in the absorption of most of these elements into the resulting solid product produced. In both cases, therefore, it is the final liquid which will actually constitute the purest aluminum.

The ultimate residual liquid fraction recovered from the operations summarized in Table VII, and further concentration, was found to be quite impure with respect to iron content, assaying 0.81% Fe. This product was sub-

*Table VI*

[Speed of Rotation: 66 r.p.m. Inclined from Horizontal—4°]

| Test No. and Start Mat. | Weight (lbs.) | | | Percent Fe | | | Percent Frozen of total | K-factor, sol./liq. |
| --- | --- | --- | --- | --- | --- | --- | --- | --- |
| | Chge. | Solid | Liq. | Chge. | Solid | Liq. | | |
| 212 (Head Metal) | 20.43 | 12.68 | 7.75 | .143 | .043 | .30 | 61.8 | .143 |
| 216 (Solid-A) | 20.93 | 10.75 | 10.18 | .057 | .011 | .105 | 51.3 | .105 |
| 217 | 21.68 | 13.06 | 8.62 | .014 | .003 | .030 | 60.2 | .100 |
| Average | | | | | | | | .116 |

*Table VII*

[Speed of Rotation: 66 r.p.m. Inclined from Horizontal—7.5°]

| Test No. and Start Mat. | Weight (lbs.) | | | Percent Fe | | | Percent Frozen of total | K-factor, sol./liq. |
| --- | --- | --- | --- | --- | --- | --- | --- | --- |
| | Chge. | Solid | Liq. | Chge. | Solid | Liq. | | |
| 226 (Liquid-A) | 24.06 | 15.37 | 8.69 | .160 | .043 | .41 | 63.8 | .106 |
| 227 (Liquid-B) | 24.50 | 14.31 | 10.19 | .042 | .008 | .084 | 58.4 | .095 |
| 228 (Liquid-C) | 25.00 | 15.25 | 9.75 | .007 | .002 | .019 | 61.0 | .105 |
| Average | | | | | | | | .102 |

In Table VI the tests include typical examples of primary, secondary and tertiary refining operations conducted with the original head metal, representing the "solids from solids" method. In addition to these tests, a fourth refining operation was conducted with the Solid-B from Test No. 217 of Table VI, and the results (Solid-C) of this run are presented in tabulated form in Table VIII below. The various residual liquid fractions recovered from the tests of Table VI were also subjected to refining, grouped together by analyses to give about the same analyses in the respective charges as were shown for the tests in Table VI. The results of these operations are presented in tabulated form in Table VII above, and this method may be termed "Solid from Liquids" refining. In this series of liquid refinings, a fourth (Solid-D) fraction was made with a corresponding liquid phase, and the analytical data for these products are also presented in Table VIII below.

jected to further refining for purposes of extracting a purer aluminum metal therefrom, and, at the same time, to ascertain the degree of concentration of impurities that could be obtained in the corresponding liquid fraction. In these operations the relatively highly impure liquid was employed as the starting material to derive a still more contaminated liquid, while retaining the deposited solids in the retort, with the exception of small samples removed for spectrographic analysis. To each consecutive solid there was added additional make-up quantities of previously refined return liquid fractions of approximately the same analysis. The charges were melted and a head-sample take each time following thorough mixing of the total charge by rotation of the retort. This series of refinings required six separate steps, since two preliminary refining operations were necessary to derive a solid of purity equivalent to the original electrolytic metal, whereas four stages of refining brought the metal to a purity

*Table VIII*

| | Cu | Fe | Si | Zn | Ni | Ga | Ti | V | Total Al Contained, percent |
| --- | --- | --- | --- | --- | --- | --- | --- | --- | --- |
| Solid-C | .000 | .000 | .002 | .000 | .000 | .000 | .045 | .033 | 99.913 |
| Liquid-C | .002 | .004 | .009 | .001 | .000 | .002 | .002 | .005 | 99.970 |
| K-factors | | | .22 | | | | 22.5 | 6.6 | |
| Solid-D | .000 | .001 | .002 | .001 | .000 | .000 | .008 | .009 | 99.973 |
| Liquid-D | .002 | .003 | .008 | .002 | .000 | .003 | .001 | .000 | 99.977 |
| K-factors | | .33 | .25 | .50 | | | 8.0 | 9.0 | |
| Original Head Metal sample | .0185 | .165 | .160 | .000 | .002 | .014 | .0035 | .004 | 99.63 |

Note.—Total Al content based on 19 elements as impurities, hereinafter.

equivalent to the Solid-D of Table VIII. The tabulated data presented in Table IX below represent the analytical results obtained for the first two stages of this operation as well as the last two stages:

*Table IX*

Heating: Gas Burner with Metal Deflector.
Speed of Rotation: 66 r.p.m.
Retort Tilted 4° from Horizontal for Tests Nos. 240 and 241 and 12.5° for Tests Nos. 244 and 245.

| Test No. | Weight (lbs.) | | | Percent Fe | | | Percent frozen of total | K-factor, sol./liq. |
|---|---|---|---|---|---|---|---|---|
|  | Charge | Solid | Liquid | Charge | Solid | Liquid |  |  |
| 240 | 19.44 | 11.44 | 8.00 | .81 | .35 | 1.46 | 58.8 | .240 |
| 241 | 20.69 | 14.19 | 6.50 | .31 | .12 | .72 | 68.5 | .167 |
| 244 | 27.50 | 20.50 | 7.00 | .007 | .002 | .022 | 74.5 | .091 |
| 245 | 19.88 | 14.38 | 5.50 | .002 | .001 | .005 | 72.3 | .200 |

ADDITIONAL ANALYSES

| Sample | Cu | Fe | Si | Zn | Ni | Ga | Mg | Ti | V | Al |
|---|---|---|---|---|---|---|---|---|---|---|
| 240 Head | .082 | .81 | .55 | .012 | .008 | .048 | .038 | .000 | .000 | 99.448 |
| 245 Solid | .000 | .001 | .002 | .001 | .000 | .000 | .000 | .001 | .001 | 99.989 |
| 245 Liquid | .000 | .005 | .017 | .002 | .000 | .001 | .000 | .000 | .000 | 99.97 |
| K-factors |  | .20 | .12 | .50 |  |  |  |  |  |  |

It will be noted by reference to Table IX that the final solid product of this series actually represents the purest metal, since the starting material was a liquid fraction which had previously undergone several reductions in its Type B impurites content, and was, therefore, practically free of the elements titanium and vanadium. The resulting super pure solid product (No. 245-Solid) was again subjected to freeze refining and distributed into a corresponding liquid and solid phase, and it was found that a still further reduction of the iron content and silicon content and silicon content in the deposited solid took place. The tests listed indicate, therefore, that the method is inherently capable of effecting a far reaching purification. The spectrographic analytical data for the two fractions obtained in the foregoing operation are tabulated below.

ANALYTICAL DATA

*Test No. 246*

| Sample | Cu | Fe | Si | Zn¹ | Ni | Ga | Ti | V | Zr | Total Al, percent |
|---|---|---|---|---|---|---|---|---|---|---|
| 246 Solid | .000 | .000 | .001 | .002 | .000 | .000 | .002 | .002 | .002 | 99.985 |
| 246 Liquid | .001 | .001 | .004 | .003 | .000 | .001 | .000 | .000 | .000 | 99.984 |
| K-factor |  |  | .25 | .75 |  |  | >2.0 | >2.0 | >2.0 |  |

¹ Zinc by contamination.

In later tests, where more solid metal was available corresponding in analysis to No. 246, a still further refining brought the purity of the liquid fraction up to 99.995 percent aluminum.

In the foregoing test, commencing with a charge of 13.75 pounds, a solid phase of 7.94 pounds was deposited during 25 minutes freezing time, or at a rate of about 19.2 pounds per hour. It is of interest to note that in this series, the appearance of the successive solid phases as collected on the cylinder wall changed markedly. Thus, the initial solid (Test No. 240) has a coarse weave pattern which became increasingly finer in texture as the purity of the metal increased, until the final solid (Test No. 245), which had an almost mirror-like surface. Accordingly, it may be possible to estimate the relative purity of the depositing solid phase by inspection of its surface characteristics. In addition, other physical properties of the successive solids showed marked changes as the purity of the metal increased. For example, when drilling the samples with an electric drill, it was observed that the initial solid was easy to penetrate and produced relatively short turnings, whereas the final solid was difficult to drill and produced long uniform turnings. In a similar manner, the liquid products gradually changed during the successive stages of refining, from a brittle metal in the first test producing small chips when drilled, to a ductile metal for the last test producing larger and more flexible chips. Lastly, the color of the metal was extremely silvery and shiny at the higher purity, and above 99.9% purity the brilliancy of the metal is extremely enhanced as contrasted, for example, with metal of 99.63% Al which exhibits a diffuse white color rather than true brilliancy.

The following additional tabulated data (Table X) were collected in further refining operations conducted with the retort operated at an inclination of 12.5° from the horizontal. The metal used consisted of a composite product derived from the preceding tests, and the retort was equipped with the frontal butane gas burner having a monel metal deflector functioning to deflect the gas flame against the inner frontal refractory wall and to expel the gases of combustion out of the front opening in the retort. The tests were conducted for comparative purposes at two different rotational speeds, namely, 86 r.p.m. for Test No. 249 and 66 r.p.m. for Test No. 251. About 25 grams of salt flux was used in each run. The charge weight for Test No 249 was 27.56 pounds, with the weight of the deposited solid phase, frozen in about 70 minutes, being equal to 18.5 pounds, representing a freezing rate of about 16 pounds per hour. The charge weight for Test No. 251 was 22.12 pounds, with the weight of the deposited solid phase being 11.69 pounds, frozen in about 47 minutes or at a freezing rate of about 15 pounds per hour.

accompanies a slightly reduced temperature for the liquid phase, is advantageous during freezing-out of the solid phase, since the depositing solid phase would be in equi- Table X

| Test No. | Cu | Fe | Si | Zn | Ni | Ga | Ti | V | Zr | Cr | Total Al, percent |
|---|---|---|---|---|---|---|---|---|---|---|---|
| 249 (Charge) 100% | .005 | .022 | .037 | .003 | .002 | .007 | .006 | .004 | .002 | .001 | 99.908 |
| 249 (Solid) 67.4% | .002 | .005 | .002 | .002 | .000 | .003 | .009 | .006 | .002 | .002 | 99.954 |
| 249 (Liquid) 32.6% | .011 | .057 | .088 | .005 | .006 | .015 |  |  | .002 |  | 99.816 |
| K-factor | .182 | .088 | 1.36 | .40 | Indef. | .20 | 9.0 | 6.0 | 1.0 | 2.0 |  |
| 251 (Charge) 100% | .001 | .002 | .007 | .0015 | .0005 | .001 | .007 | .007 | .0035 | .0015 | 99.968 |
| 251 (Solid) 52.8% | .000 | .001 | .002 | .001 | .000 | .000 | .013 | .013 | .004 | .002 | 99.961 |
| 251 (Liquid) 47.2% | .002 | .004 | .012 | .002 | .001 | .002 | .001 | .001 | .001 | .001 | 99.969 |
| K-factor | Indef. | .25 | .167 | .50 | Indef. | Indef. | 13.0 | 13.0 | 4.0 | 2.0 |  |

These tests, at reasonably high freezing rates, show good K-factors, it being again confirmed that best K-factors for iron, silicon and gallium are obtained at a medium purity range, and also that the Type B-impurities are best eliminated at lower rotational speeds.

In the higher purity range of Test No. 251, it may be noted that the distributions of the elements iron and silicon still represent a useful K-factor, indicating that the extreme limit of potential purity was not reached. The accuracy of even the spectrograph is limited at this point.

In an effort to demonstrate the attainable concentration of impurities in the liquid phase, three different runs were conducted using as the head metal residual liquids recovered in previous refining operations. This metal was derived from the 200 pounds of metal initially employed in the tests tabulated in Table VI and subsequent tests. One of these tests has been tabulated previously, namely, Test No. 240, whereas Test No. 247 utilized the residual liquid discharge from Test No. 240. The results of these runs are tabulated in Table XI below:

Table XI

Speed of Rotation: 66 r.p.m.
Retort Inclined: 7° from horizontal.

| Test No. | Freeze Time (Mins.) | Weight (lbs.) | | | Fe, Percent | | | Percent Frozen of total | K-factor, sol./liq. for Fe |
|---|---|---|---|---|---|---|---|---|---|
| | | Chge. | Solid | Liq. | Chge. | Solid | Liq. | | |
| 225 | 68 | 24.75 | 14.44 | 10.31 | .64 | .20 | 1.20 | 58.0 | .167 |
| 240 | 54 | 19.44 | 11.44 | 8.00 | .81 | .35 | 1.46 | 58.8 | .233 |
| 247 | 42 | 12.50 | 5.50 | 7.00 | 1.14 | .73 | 1.50 | 42.0 | .555 |

The respective freezing rates for the foregoing tests were: 12.7 pounds per hour for Test No. 225; 12.75 pounds per hour for Test No. 240; and 7.85 pounds per hour for Test No. 247. The melting point of the liquid in Test No. 247 was determined to be about 651° C., or about 9.2° C. below that of pure aluminum metal. In contrast thereto, the melting point of the solid from Table VIII, was determined to be about 662° C., or almost 2° above the melting point of pure aluminum. Apparently, the titanium and vanadium contents of the latter metal are responsible for the increased melting point.

It was concluded on the basis of the foregoing results that a limit of 1.50% iron may be reached in the liquid phase while still maintaining a useful K-factor, although the K-factor will become less effective for separation purposes the closer one gets to the eutecticum composition between iron and aluminum (1.9% Fe; M.P.=654° C.). It is apparent that an increased rate of freezing, which librium with the liquid phase only at one certain temperature, above which the liquid would redissolve deposited solids. Ideally, therefore, the temperature of the liquid phase should be permitted to adjust itself consistent with the phase diagram, while still supplying sufficient heat such that crystalline growth habit present therein will be dissolved. On the other hand, it is clear from the experimental data presented that the process is not overly sensitive to use of temperatures slightly above the theoretically ideal temperature, and, in point of fact, for very close separation of a highly purified solid it may be advantageous to operate at slightly higher temperature values, thereby effecting increased freezing time but improved K-factors.

In order to demonstrate the advantages of the split freeze-refining technique of the invention, several tests were conducted in which only a limited percent of solids was deposited, such as 15 to 20% by weight. Significantly, it was noticed that the results of these tests were not as might be expected, in that, the purity of the metal obtained in the first stage was not as high as the average purity of the metal which could be produced by freezing-out a greater percentage of solids. In addition, it took longer to freeze the reduced portions of solid than was to be expected. In particular, it was noticed that the initial frozen layer had a very uneven and rough surface, whereas in tests in which greater quantities of metal had been solidified, the interior of the retort resembled that of the surface of a glass bottle with respect to evenness and general surface uniformity.

The foregoing observations led to additional tests in which a large amount of deposited solid was frozen out under ideal conditions, following which, the over-all deposited solids were subjected to a differential melt-out, such that the outer layers of the solid phase could be separated from inner layers and subjected to separate analysis.

For comparative purposes, the tabulated data presented below in Table XII illustrate typical results obtained in freezing a small quantity of solids out of a charge consisting of normal grade electrolytic aluminum:

By the instantaneous K-factor is meant the ratio of percent iron content in the very last layer of solid deposited, to the percent iron content of the liquid in equilibrium with that deposited solid. The experimental value as ob-

Table XII

Speed of Rotation: 66 r.p.m.
Retort Inclined: 4° from horizontal.
Percent Solid Frozen: 15.7

| Test No. | Cu | Fe | Si | Mn | Zn | Ga | Ti | V | Zr | Cr | Total Al |
|---|---|---|---|---|---|---|---|---|---|---|---|
| 238 (Charge) | .001 | .002 | .004 | .002 | .002 | .002 | .006 | .006 | .002 | .005 | 99.966 |
| 238 (Solid) 15.7% | .000 | .001 | .002 | .001 | .001 | .001 | .023 | .019 | .004 | .007 | 99.939 |
| 238 (Liquid) 84.3% | .001 | .003 | .006 | .002 | .002 | .002 | .002 | .004 | .002 | .005 | 99.969 |
| K-factor | Indef. | .33 | .33 | .50 | .50 | .50 | 11.5 | 4.75 | 2.0 | 1.4 | |

With reference to the foregoing data, it may be observed that the K-factors obtained for the elements iron, silicon and gallium are not as good as might be expected for initial deposits, but a generally high concentration in the solid obtains for B-elements.

In Table XIII, there are listed the results of test runs in which portions of the deposited solid were differentially melted to achieve "peeling-off" of successive layers to determine the nature in which a combined deposit is actually built up during the freeze refining process.

tained only approximates the thin final layer, but it is an approximation of considerable interest. It may be noted that the theoretical curve for the instantaneous K-factor of 0.10 generally agrees with the experimental curve, shown by circled coordinates in FIG. 5, both for the lower curve (solid) as well as for the expected content of iron in the liquid fraction which is shown in the upper half of FIG. 5. It is to be noted, however, that after 76.4% solids have been frozen out of the total, the last deposit

Table XIII

Speed of Rotation: 66 r.p.m.
Retort Inclined: 12.5° from horizontal.
Metal: Composite.

| Percent Frozen of Total | Layer No. | Test No. 261 | | | | | | K-factor | |
|---|---|---|---|---|---|---|---|---|---|
| | | Weight (lbs.) | | | Percent Fe | | | | |
| | | Liq. | Solid (by Fractions) | Cum. Solid | Liq. | Solid (by Fractions) | Cum. Solid | Indiv. | Avg. |
| None | 0 | 23.00 | None | None | .133 | | | | |
| 23.3 | 1 | 17.56 | (5.44) | 5.44 | .17 | (.012) | .012 | (.071) | .071 |
| 34.5 | 2 | 14.87 | (2.69) | 8.13 | .20 | (.008) | .011 | (.040) | .055 |
| 50.5 | 3 | 11.18 | (3.69) | 11.82 | .27 | (.030) | .017 | (.111) | .063 |
| 66.5 | 4 | 7.55 | (3.63) | 15.45 | .36 | (.042) | .023 | (.117) | .064 |
| 76.4 | 5 | 5.36 | (2.19) | 17.64 | .45 | (.136) | .037 | (.301) | .082 |

It may be noted that the foregoing test represented a good average performance, and, as such, it may be considered truly representative of the best previous experimental runs. The first deposited layer of solid in this test demonstrates only a slight tendency towards reduced purity as compared with the second deposited layer. The following deposited solids increase regularly in iron content to the last layer which is extremely high in contained iron. This illustrates the fact that, in small scale runs wherein only a few pounds of liquid metal remain at the end of the run, there will be insufficient physical coverage for the liquid at that point to be in true equilibrium contact with the depositing solid. Accordingly, errors will be introduced by indiscriminate freezing on the outer fringes of the deposited solid as the liquid pool recedes, and also because the rate of freezing will increase greatly towards the end.

From a comparison of the results obtained in Test No. 238 and Test No. 261, it is clear that the initial deposited solid layer in the latter test, although good, was not as high grade as might be expected. This deviation demonstrated clearly that aluminum metal forms the best surface for receiving newly depositing solids, as compared to the refractory lining. It seems also that the first deposit on the refractory lining has the character of being a forced deposit, and that thereafter it undergoes a further purification by exchange.

The curve of increasing impurities in the depositing solid phase of Test No. 261 is plotted for the instantaneous K-factor of 0.10 for iron in FIG. 5 of the drawings.

contains substantially more iron than might be expected from the theoretical plot.

The average K-factor, which has been used herein in all of the tabulated experimental data, is arrived at by melting the total deposited solid phase, and thereafter removing an average sample for analysis, i.e., without regard to the concentration of elements contained in the successive solid fractions. In essence, the average K-factor is most important for a practical evaluation of the process of the invention, whereas the instantaneous K-factor is of greater theoretical and design value. The deposition curve for the average solid is shown in FIG. 5 as appearing below the curve for the instantaneous solid, which is in accord with theory.

The foregoing expedient involving use of an initial layer of aluminum to commence the depositing solid phase has been embodied in the split freeze-refining technique illustrated in FIG. 8 of the drawings. That is to say, the liquid phase is only partially frozen out in the initial stage, and is then passed on in diminishing quantity to a subsequent retort, and so on, until the desired concentration has been achieved. For a continuous operation involving many retorts, the return liquids may be disposed of advantageously by cycling to a preceding stage of another retort, it being understood that all retorts are spaced in time sequence, in proportion to the total cycle time. A residual liquid may be added to the start of a preceding operation, or halfway through the refining cycle, or even near the end of a run, with good results, but the preferred introduction would be at the last charging of a preceding retort, since a larger percentage of metal could thereby be removed from the liquid phase without disrupting the relative purity of the finally deposited solid layer from the previous charge. Return liquids, substantially free of B-elements, may also be upgraded advantageously in special retorts.

To gain a more complete insight over conditions prevailing within the retort during freeze refining, several additional tests were conducted in conjunction with close observation of prevailing temperatures. In those tests conducted in the absence of internal heating, the temperature of the liquid pool dropped off quickly to the melting point of the metal, while crystals were formed in the liquid and the over-all mass gradually thickened. The temperature in the middle of the retort directly beneath the ceiling was about 600° C., while the liquid phase remained constant at about 657° C. throughout the run. The latter temperature was later confirmed to be the melting point of this metal.

In still other tests utilizing the same metal, but with heat applied to the retort in the preferential manner, the temperature of the liquid slowly dropped to the melting point of 657° C., but no crystals formed in the liquid. The temperature within the retort directly beneath the ceiling, now registered from 15 to 35° C. above the melting point of the liquid phase, which was again established to be 657° C. The temperature immediately above the gas flame deflector registered about 800° C.

In the foregoing tests, the rate of freezing was established to be about 17.5 pounds of solid per hour with internal heating, and about 35 pounds per hour with no internal heating. Most of the better K-factors obtained in these tests represented operations conducted with a freezing rate of between 10–20 pounds per hour. For example, Table XIV below illustrates the comparative refining action for a metal frozen at the rate of only 7.6 pounds per hour, versus the same metal frozen at the rate of 26 pounds per hour:

*Table XIV*

| Test No. | Sample | Type A Impurities | | | | Type B Impurities | | | Freezing Rate, lbs./hour |
|---|---|---|---|---|---|---|---|---|---|
| | | Cu | Fe | Si | Ga | Ti | V | Zr | |
| 150 | Solid | .000 | .001 | .002 | .001 | .010 | .014 | .006 | } 7.6 |
| | Liquid | .005 | .016 | .018 | .004 | .000 | .000 | .001 | |
| | K-factor | Indef. | .062 | .11 | .25 | >.10 | >.14 | 6.0 | |
| 245 | Solid | .000 | .001 | .002 | .000 | .001 | .001 | | } 26.1 |
| | Liquid | .000 | .005 | .017 | .001 | .000 | .000 | | |
| | K-factor | Indef. | .20 | .12 | Indef. | >1 | >1 | | |

It will be noted that the differences in K-factors for the foregoing tests is relatively small for silicon but appreciable for iron, and that the lower rate of freezing shows the more pronounced separatory action. At a normal freezing rate of about 20 pounds per hour, figuring approximately 2 square feet of cylindrical wall area of the retort, there is deposited about 10 pounds per hour per square foot of wall surface. This represents a deposit of about ¾ of an inch thickness on the retort wall after one hour of freezing. In other words, in this case the solid deposit grows at an average rate of approximately 1/80 of an inch per minute or for each revolution of the retort the incremental increase in thickness will be 1/5300 of an inch. This is a relatively slow growth as compared to zone refining, for example, where the solid phase grows at a rate of, for example, ⅛ of an inch per minute, or about ten times the rate of the freeze refining technique of the invention for the example cited.

The difference between zone refining and freeze refining as practiced in accordance with the inventor's invention, is essentially that in some refining a narrow liquid pool of metal traverses a long, solid ingot at the rate indicated, whereas in the present process the partly immersed deposited solid moves at a speed of, say between 2–5 feet per second through a large liquid reservoir of metal, with the depositing cycle being broken by a half cycle of cooling and firming-up of the immediately preceding deposit. Again, in zone refining the solid phase remains stationary and the liquid phase is moved, whereas in the present process the solid phase is moved through the liquid phase in a semi-continuous fashion.

It follows from the results given that extremely close separations can be effected by the process of the invention, and one may, under different circumstances, arrange to provide reduced or accelerated freezing rates, depending, for example, on whether maximum separation or maximum production is desired. Essentially, the important variables in the process of the invention include the thermal insulating quality of the retort lining, the input, quantum and placement of the internal heating, the speed of rotation of the retort, the maintenance of effective longitudinal and transverse agitation of the liquid phase, and the degree of inclination of the retort from its normal horizontal axis. In this connection, it should also be noted that the deposition surface of the refractory lining of the retort should be amenable to adhesion or anchoring of the initial metallic film. As pointed out hereinbefore, it is most advantageous to establish a preliminary coating of aluminum on the refractory. Usually, most refractory surfaces demonstrate sufficient wetting or penetration by aluminum metal in the liquid phase to serve as the deposition surface, per se. With surfaces of carborundum, graphite, and the like, which are not readily wetted by liquid aluminum, is found that the use of a small amount of a salt flux aids appreciably in the wetting and adhesion of the initial liquid metallic coating. A combination of a heat-conductive inner frontal refractory of carborundum with the rest of the lining being formed of a less conductive layer of alundum, is found to be a preferred arrangement for use in the refining of aluminum.

The preceding discussions have been directed to processing techniques in which deposition of a purified solid phase is effected with elimination, or eventual re-cycling of residual liquid fractions of varied purities. In another version of the process which has been used to advantage, it is possible to effect selective re-melting of the last portion of a previously deposited solid phase, and thereafter permit a new exchange between the molten and solid phases. This is of particular usefulness in obtaining sharper separation of the Type B impurities, i.e., those impurities tending to raise the normal melting point of the aluminum metal.

Figure 6:
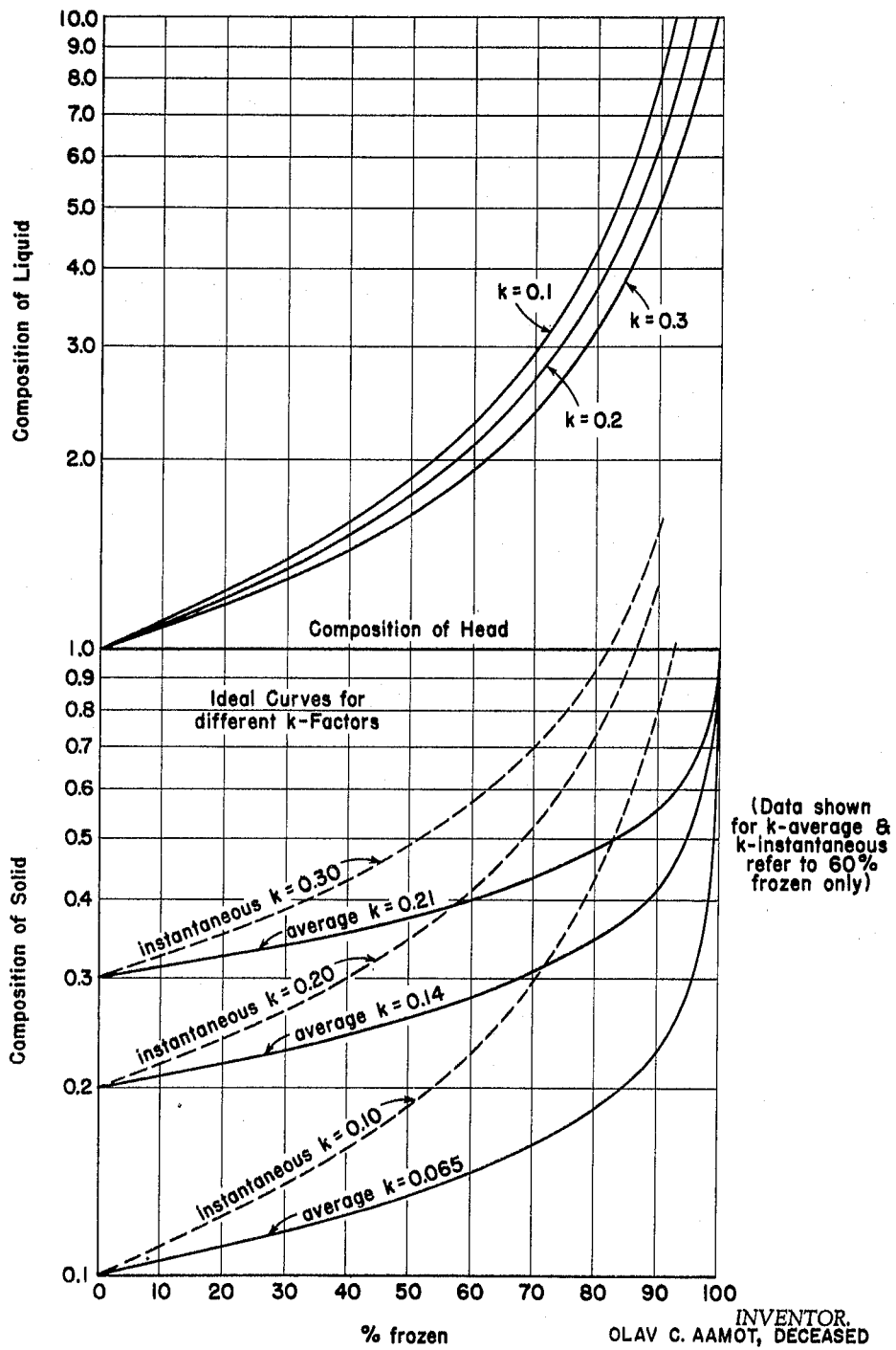
FIG. 6 is a similar graph illustrating comparative instantaneous and average values, for different K-factors from 0.1 to 0.3, for both the liquid and solid fractions, of the concentration of impurities as a function of deposited metal.

Another useful modification of the basic process of the invention involves adjustment of a previously deposited solid phase, with respect to Type A impurities, to control the finally deposited product. In essence, this amounts to a sort of half-step freezing cycle, and is logically based upon the deposition curves as shown in FIGS. 5 and 6, wherein it will be noted that the initial deposits of the solid phase are contaminated relatively slowly, but after approximately one half of the total available aluminum has been deposited, the concentration of impurities in the solid phase increases more rapidly, since the liquid in equilibrium with the solid phase at this point is substantially more contaminated with respect to impurities of the Type A category.

To illustrate the foregoing technique, another series of tests was conducted, in which a large amount of solid was deposited initially and the highly impure final liquid phase removed from the retort. Thereafter, the gas burner was re-inserted in the retort and a portion of the deposited solids melted down to form a fairly large liquid phase, while the retort was rotated at a speed of 66 r.p.m. The gas burner was then equipped with the metal deflector and operations commenced according to normal freeze-refining practice. Heat was supplied to the liquid phase via the frontal refractory lining for a period of twenty minutes to effect slow deposition of metal therefrom. At this time, the small residual liquid was discharged, and is called Solid-A below. Then the remainder of the solid was melted out, and this is referred to as Solid-B in the table below. The results of this test are tabulated in Table XV:

*Table XV*

(TEST NO. 264)

Speed of Rotation: 66 r.p.m.
Retort Inclined: 12.5° from Horizontal.
Charge: Composite.

| Sample | Weight, lbs. | Percent Fe | K-factor | Percent Frozen |
|---|---|---|---|---|
| Charge | 22.313 | .23 | | |
| Solid-A | 1.937 | .47 | } .085 | { 8.7 76.8 |
| Solid-B | 15.188 | .040 | | 68.0 |
| Total solid | 17.125 | ¹.089 | } .132 | |
| Final liquid | 5.188 | .67 | | |

¹ Average.

With reference to the foregoing data, it will be noted that in the remelting and freeze-refining cycle, from which Solid-A was discharged, a new equilibrium condition was obtained between the solid and liquid phases, for which an average K-factor of 0.085 was established. Accordingly, the resultant Solid-B was considerably improved in purity. Considering Solid-B, with a content of only 0.04% Fe as compared with the final residual liquid of 0.67% Fe, one obtains an average K-factor of 0.06 for the run. On the other hand, if one adds Solid-A to the final residual liquid, there is obtained an average content of 0.615% Fe, and the K-factor of Solid-B over the combined liquid phase then becomes 0.065, or only slightly higher than that obtained on the basis of Solid-B and the original residual liquid phase.

It will be evident that in re-melting a portion of a previously deposited solid phase, and letting it undergo adjustment to obtain new equilibrium conditions, one also counteracts inaccuracies in the original freeze-refining cycle caused by insufficient physical coverage and some indiscriminate freezing-out of liquid on the fringes of the deposit as well as too fast freezing towards the end. In essence, this method of operation provides a means for leveling off the impurity content of a deposit, such that the finally deposited solid is reconstituted to conform more closely to the initial higher purity fractions of the overall deposit. The method thereby contributes to a more efficient refining action, requiring less manipulation, and promoting an increased direct output of refined metal from each retort. The method is of particular advantage in situations in which limited retorts are available, or conversely which reduces the over-all number of retorts required in any given operation. The adjustment freezing proceeds rapidly, since conditions are excellent for growth of a new deposit on the previously established high-purity aluminum surface. The temperature of the liquid phase metal during the refining was found to be very nearly the same in both freezing operations, close to 659° C., or actually about 1 to 2° C. above the melting point of the liquid metal obtained. The method has also been used advantageously for removing A-impurities from the tail-end of the deposit, followed by a differential melt-out of a portion of the final solid, but leaving as standing on the wall the initial deposit containing the bulk of B-elements.

In the processing of scrap aluminum, it was observed that the contents of silicon and copper did not hinder the refining action when present in concentrations sufficiently removed from the eutectic concentrations, except, of course, that the temperature of the liquid phase must be reduced in accordance with the corresponding theoretical values obtained from the appropriate phase diagrams.

A content of up to approximately 10% of magnesium could also be dealt with effectively except that the iron elimination was unsatisfactory. This may be explained by the fact that in such an alloy system, the melting point is reduced to approximately 620° C., which is far below the eutectic temperature for the normal iron-aluminum alloy system (654° C.), and that, accordingly, the liquid solubility of iron in aluminum is very much reduced. In order to effect more efficient removal of iron from a near eutectic liquid concentration of 1.50% Fe, recovered in earlier refining runs, it was found that settling stages were quite effective. In particular, by employing as high as 28% magnesium additive in this iron-aluminum alloy system, the liquid solubility of iron is adjusted to about 0.18% Fe and an iron-aluminum compound of composition approximately $Al_3Fe$ will settle out, thereby promoting effective iron separation. By distilling the magnesium away by vacuum distillation techniques or the like, such that the resulting metal contains only a few percent magnesium, the liquid may then be treated by the freeze refining technique of the invention with excellent results.

Advantageously, the settling-out of iron-aluminum compounds from the 28% magnesium-aluminum-iron system can be effected in the rotary retort of the invention, under rotational speeds sufficient to suspend the total liquid contents on the cylindrical lining, such that the settling action occurs over the relatively short distance to the peripheral wall and at a temperature slightly above the melting point. The depositing compound of composition approximating $Al_3Fe$, has a theoretical iron content of 40.7% and a melting point of about 1160° C., which favors close separation after the settling action has taken place. This is done by tilting the retort to a vertical position and deaccelerating the retort to pour off the liquid metal, by then subjecting the poured-off liquid to vacuum distillation, the magnesium additive is readily removed and the residual aluminum metal, which may contain a little magnesium, may be treated by freeze refining to remove iron and magnesium, etc., therefrom. Significantly, the magnesium additive may constitute scrap magnesium, whereas the distilled magnesium will be a high purity product suitable for marketing as such.

An addition of zinc to the metallic aluminum is not good for freeze-refining purposes, in that, the solid solubility of zinc in aluminum is very high, with the result that relatively poor K-factors are obtained. On the other hand, a few percent of zinc in scrap metal to be refined may be tolerated, with larger amounts being removed by an initial distillation operation, to facilitate good recoveries of high-grade aluminum in subsequent applications of the freeze-refining technique of the invention. For example, considering scrap aluminum in which the content of zinc is quite high, the inventor effected removal of all but about 1% of the zinc by preliminary distillation. If the iron content at this point is around 1%, a single stage of freeze-refining will serve to concentrate the iron in the liquid phase to about 1.5% Fe, which is suitable for the addition of magnesium, and subsequent settling out of an iron aluminum compound in the manner described above. Following this treatment, and after removal of the magnesium, the residual iron of, say, about 0.25% Fe, and 1–2% Mg, may be re-established in a subsequent liquid fraction at 1.5% Fe by application of the freeze-refining technique of the invention. In this manner, one may successfully extract additional large quantities of high purity aluminum from the original alloy.

Gallium metal is the most persistent of the Type A impurities, i.e., serving to lower the melting point of aluminum, and, according to some authorities, a eutecticum occurs at close to 97.5% gallium content, at a temperature of about 29° C. It follows, therefore, that the technique of re-treating the near eutectic iron-aluminum liquid fraction will eventually yield a high concentration of gallium in the more and more concentrated liquid phase.

By way of summation of the experimental results obtained by the three distinct methods (A, B and C) for application of the refining technique of the invention, wherein:

Method A=no addition of heat during freezing;
Method B=heat addition to the general interior of the retort during freezing; and
Method C=heat addition selectively to the liquid metal during freezing;

one can say that the efficiency of the refining action can be compared in terms of the resulting K-factors for the element iron, as follows:

Method A—K-factor of the order of 0.40
Method B—K-factor of the order of 0.20
Method C—K-factor of the order of 0.10

By introduction of the term "$K_{sol/head}$," designating the drop in impurity content, and particularly in iron from one solid to the next, the importance of K-factors can be further evaluated. Thus, the $K_{sol/head}$ is related to the usual average $K_{sol/liq}$ as per the following equation:

$$K_{sol/head} = \frac{K_{sol/liq}}{(1-g) + (g \cdot K_{sol/liq})}$$

where $g$=fraction frozen

From the foregoing equation one finds, for 60% of the total frozen each time ($g$=0.6);

Method A:
$K_{sol/liq}=0.40$
$K_{sol/head}=½$

Method B:
$K_{sol/liq}=0.20$
$K_{sol/head}=⅓$

Method C:
$K_{sol/liq}=0.10$
$K_{sol/head}=⅕$

Thus, by maintaining $g$ constant at 0.6 or 60% frozen for each successive freeze, and starting with a head metal of assay equal to unity (for iron), the inventor determined the assay of iron which will obtain from one solid to another in the three different refining methods, with the assay then being expressed as a fraction of the original head assay. These data are presented in tabulated form below:

Table XVI

| Stage | Head | Solid I | Solid II | Solid III | Solid IV |
|---|---|---|---|---|---|
| Wt. recovered, percent | 100 | 60 | 36 | 21.6 | 12.96 |
| Assay-Method A | 1 | ½ | ¼ | ⅛ | 1/16 |
| Assay-Method B | 1 | ⅓ | 1/9 | 1/27 | 1/81 |
| Assay-Method C | 1 | ⅕ | 1/25 | 1/125 | 1/625 |

The foregoing data clearly demonstrate the enormous economic importance of establishing the best possible K-factors for the refining operation. For example, if a head metal contains 0.125% Fe, just three refining steps, in which Solid III is made to contain 21.6% by weight of the head metal, will result in the production of a solid product assaying 0.001% Fe, by application of Method C. On the other hand, by application of Method A, following three steps of refining, Solid III will contain 0.016% Fe. By way of comparison, application of Method B will result in the production of a Solid III product assaying 0.0046% Fe. Thus, it would take seven steps of refining by Method A, and approximately four and one-half steps of refining by Method B to equal the assay of 0.001% Fe obtained in three steps via Method C. On the other hand, with seven steps the corresponding solid (Solid V) will represent a recovery of 3.6% by weight of the starting metal, as compared to 21.6% by weight recovered in only three steps by Method C. This means, in turn, that for Method A about six times as much metal would have to be freeze-refined as compared with Method C, to obtain 1 ton of recovered metal assaying 0.001% Fe.

It is believed that the following postulated explanations of the various refining methods A, B and C will serve to illustrate the differences inherent in these methods, although the explanations are offered by day of illustration only and without intent to limit the beneficial end-effects of my process to such a theory of operation:

*Method A.—No heat input during freezing*

(See Table I, supra)

Under these conditions of operation, it is believed that deposition occurs so rapidly that contaminating atoms are buried under successively depositing layers of solids crystals. That is to say, the agitation is not sufficient, even at high r.p.m., to enable such contaminating atoms to escape by diffusion from the crystal lattice. In the liquid, crystals will form and multiply at a relatively rapid rate, causing the remaining liquid metal to become more and more impure. Of course, it is from this contaminated liquid metal that new solid layers are deposited on the retort wall.

*Method B.—Heat added to the general interior of the retort*

(See Tables II and III, supra)

Under these conditions of operation, the deposition of solids crystals on the retort walls can be regulated to proceed more slowly, so that contaminating atoms are more readily removed from the crystal lattice and returned to the main pool of liquid metal. Thus, a considerable improvement in refining is obtained, but, considerable oxidation of metal also occurs when using a conventional gas flame as the source of heat energy. Finally, it is found that the discharged impure liquid may still contain some crystalline growth habit.

*Method C.—Heat added selectively to liquid pool metal*

(See Tables IV–XV, supra)

Under the conditions of operation prevailing in this method, the heat of addition proceeds through the liquid metal and thence to the solid deposit, and out of the retort. This principle of heating makes it possible to maintain the liquid residual metal at a temperature sufficiently elevated that no solid crystalline growth can survive therein, and, yet, the massive solid deposits will not become re-dissolved, except under the conditions explained hereinafter. As for Method C, the rate of deposition of solid can be regulated at will, although as demonstrated by the experimental data presented above, this method is effective in producing much better refining action than that obtained by application of Method B.

It is believed that the improved results obtained by Method C as compared with Method B are due to a selective dissolution of a top layer of the solid, which results from some deposition occurring in the upper swing of the retort, from the liquid metal film carried around during each revolution of the retort. To explain further, Method C consists essentially of rolling up a thin sheet of crystals on the inside of a rotating retort, wherein the massive solid accumulating on the walls of the retort will move into and out of the general liquid pool of metal maintained in captive position at the bottom of the retort. The cooling occurring from the outside, may be considered to be very constant, with heat being added selectively to the liquid pool by the technique described hereinbefore. Accordingly, during the upper swing of the retort, essentially cooling only will occur, whereas in the downswing essentially deposition will take place. On the other hand, when the solid emerges from the liquid pool and commences the upper swing, it cannot be avoided that some liquid metal will cling to and follow the solid in the form of a thin film, and some deposition from this film most likely occurs throughout the arc of the upper swing.

In the case of deposition of crystals, there is no agitation of any consequence between the solid surface and the overlying film, and, hence, the resulting solid deposit will be somewhat mediocre with respect to purity, as compared with the solid deposited during the rapid movement under the heated liquid pool of metal. There could even occur substantially complete freezing of the entire liquid film, but, since under conditions of thorough freezing the resulting liquid will also have a lower melting point, this danger may not be significant. In point of fact, and as stated hereinbefore, one can observe, especially at reduced speeds of rotation, that the very inside of the solid deposit constitutes a flexible oxide film traveling with the deposit, but being lifted off each time the deposit strikes the metal pool. The film is then carried across the liquid pool at the same linear speed as that of the retort wall, thus going around and around, usually carrying particles of dross with it. The fact that this film can be lifted off onto the liquid pool, demonstrates that it cannot be solidly fixed to the underlying solid deposit, but that there must exist some liquid metal between the oxide film and the general surface of the deposit.

After the aforementioned oxide film has been lifted off in the manner described, it is further believed that any impure top deposit resulting from deposition which occurs during the upper swing, is selectively washed and/or scrubbed off during the initial travel of the same under the liquid pool. After this time, the surface of the deposit will have undergone a corresponding cooling action, and is, therefore, in excellent condition for reception of a new deposit from the liquid metal pool during its further travel therein. It then emerges on the up-going side of the retort, taking with it a new quantity of liquid metal covered by the oxide film, and the above-described performance is repeated.

It is believed that the action as described constitutes the most plausible theory tending to explain the tremendous differences realized in going from Method B to Method C. In addition, under the conditions of operation prevailing for Method C, one may readily suppress oxidation of metal during refining by the expedient of positioning the heat source sufficiently far removed from the contact with liquid metal that no high temperatures will obtain, and the combustion gases may be equally well-directed away from contact with the hot metal.

It might be pointed out that refining tests have also been carried out with a laboratory-scale retort positioned in a vertical, i.e., completely up-turned position, and about three-quarters filled with metal, but relatively poor K-factors were realized and poor control over placement of the deposit. In this case, a more fully submerged condition of the accumulating solid was realized under the liquid pool, and a barrel-shaped deposit resulted, that is, very heavy on the bottom and thin through the middle.

With the retort positioned in the preferred position, and generally about one-half filled with metal while in a tilted position, subsequently decreasing the amount of tilt as the refining action progresses, the deposit can be made very regular in the form of a thick, hollow cylinder with only slight deposition on the slower moving surfaces of the central rear wall portions, and correspondingly slight deposition in the frontal section of the retort where the conical discharge end begins.

The horizontal position of the rotating retort generally yields the best cooling by air, although it is entirely possible to employ auxiliary forced cooling for the outer surfaces of the retort. Thus, with no artificial cooling, the horizontal or moderately tilted position is preferred, and it is relatively easy to maintain a steady rate of freezing, such as, for example, ten pounds of metal frozen per hour per square foot of inner cylindrical wall surface, which for most cases will yield good performance characteristics and insure good K-factors.

With respect to large scale operations involving Method C, it must be appreciated that the refining results described hereinbefore were obtained with a laboratory-size apparatus, and that some adjustments will be encountered in scaling-up the refining technique for use in large diameter retorts. In particular, in order to maintain the same peripheral speeds of some 2–5 feet per second of the deposit, which generally provided good results in the laboratory-scale equipment, the revolutions per minutes of a larger diameter retort would have to be decreased, with a resulting decrease in the centrifugal force tending to support the deposit against collapse. Of necessity, i.e., for good K-factors, the temperature of the massive solid on the retort wall is quite close to that of the liquid with which it is in semi-continuous contact, and, yet, it has never occurred under conditions of laboratory-scale operations that such thick deposits have collapsed following discharge of the liquid and stopping of the retort. To insure against collapse of the deposit inwardly in a commercial scale retort, it may prove necessary to adjust the speed of the rotation of the retort to a value which yields sufficient centrifugal holding action against the deposit on the retort walls, although my experience has demonstrated that the deposit should be substantially self-supporting.

Another consideration governing use of a large diameter retort is that, initially, for pickup of a liquid film by the retort wall from the main liquid pool, a higher speed of rotation may prove to be essential, until such time that the deposit does become self-supporting, at which point the speed of rotation can be lowered to those values favoring deposition of a highly purified deposit. In addition, in a large diameter retort, there will naturally be a longter time interval involved in the upper swing, such that an increased deposit from the liquid film carried through this swing might occur, but it is believed that the longer washing cycle effected in the down-swing will effectively counter this action. Furthermore, one can minimize the deposit in the upper swing by maintaining a higher temperature immediately beneath the ceiling of the retort, without unnecessarily reducing the rate of deposition.

It is considered that adjustments of the foregoing type will be readily apparent to any skilled technician, and may be effected without substantial departure from the basic operating principles of my invention.

Having thus described the subject matter of my invention what it is desired to secure by Letters Patent is:

What is claimed is:

1. An improved process for freeze-refining of a molten aluminum charge which comprises introducing a molten aluminum charge into a rotating cylindrical retort adapted to continuously dissipate heat through the walls thereof, progressively reducing the amount of molten charge by adding heat, directly to the molten aluminum charge, in an amount sufficient to prevent formation of suspended crystals of aluminum in said charge while removing heat through the walls of said retort thereby to cause deposition of solid aluminum product on the walls of said retort and withdrawing from said retort a residual liquid phase enriched in impurities.

2. The process as claimed in claim 1, wherein said retort is provided with rear and frontal refractory-lined end-pieces, said frontal end-piece having an opening therein for limited insertion into said retort of a fuel-fired burner, said burner being provided with a deflector element adapted to direct the sensible heat of combustion emanating therefrom principally against the refractory-lined frontal end-piece to effect, in turn, heating of the molten aluminum in contact therewith and to expel gases of combustion out of said retort through the retort opening.

3. The process as claimed in claim 1, wherein said retort is provided with impeller elements adapted upon rotation of said retort to effect longitudinal agitation of said molten aluminum.

4. The process as claimed in claim 1, wherein the heat input to said molten aluminum is controlled to provide an average rate of freezing for the solid deposit within the range of from 1 to 15 pounds of aluminum per square foot of retort surface area per hour.

5. The process as claimed in claim 1, wherein said retort is rotated at a pheripheral speed within the range of from 1 to 10 feet per second based on the inner cylindrical wall surface thereof.

6. The process as claimed in claim 2, wherein said retort is rotated initially in an inclined position with respect to its normal horizontal axis, with said molten aluminum being accumulated principally against the rear refractory-lined end-piece in limited contact with said heated frontal refractory-lined end-piece, the angle of inclination of said retort being decreased gradually as the refining operation progresses.

7. The process of freeze-refining a molten aluminum charge to recover a purified solid phase aluminum product and a residual liquid phase enriched in impurities which comprises
  (a) contacting the molten aluminum charge with a moving heat-abstracting solid surface to progressively reduce the amount of molten aluminum charge,
  (b) simultaneously removing heat from said heat-abstracting solid surface to effect solidification of aluminum on said heat-abstracting surface,
  (c) while adding heat, directly to said residual liquid phase, in an amount sufficient to prevent the formation of crystals of aluminum in said residual liquid phase, and
  (d) separating the residual liquid phase, enriched in impurities, from said purified solid phase.

8. The process of freeze-refining a charge of molten aluminum to produce a purified solid phase product and a liquid phase enriched in impurities which comprises progressively reducing the amount of a molten charge by contacting the same with a moving heat-abstracting solid surface, establishing and maintaining a temperature gradient across the liquid/solid interface of said molten charge and said surface by adding heat directly to the molten charge to maintain the charge free of crystals of aluminum while maintaining the solid/liquid interface at crystallization temperature.

9. In a process for the freeze-refining of a metallurgical charge, confined, in the molten state, within a refractory-lined rotating cylindrical retort to effect the separation and recovery of: (1) a purified solid phase product by the incremental crystalline deposition thereof onto the retort wall, and (2) a less-pure residual liquid phase, the improvements that comprising maintaining said molten liquid phase substantially free of solid crystalline growth, maintaining crystallization temperatures at the solid-liquid interface, and maintaining the remaining solid surface out of contact with said liquid phase at a lower temperature favoring the build-up and deposition thereon of said crystalline solid phase by heating said molten liquid phase by the application of controlled quantities of thermal energy to a selected portion only of the refractory lining in contact therewith.

10. In a process for the freeze-refining of molten aluminum confined within a portion of a rotating cylindrical retort to effect separation and recovery of: (1) a purified solid aluminum product by the incremental crystalline deposition thereof onto the retort wall, and (2) a less-pure residual liquid phase, the improvements that comprise maintaining said molten liquid phase substantially free of solid crystalline growth, maintaining crystallization temperatures at the solid-liquid interface, and maintaining that portion of the retort wall out of contact with said liquid phase at a lower temperature favoring the build-up and deposition thereon of said crystalline solid phase by heating said molten aluminum by the application of controlled quanties of thermal energy to a selected portion only of the retort wall in contact therewith.

11. The process as claimed in claim 10, wherein said retort wall is seeded to promote crystalline growth by the preliminary deposition thereon of a thin coating of high-purity aluminum metal.

12. In the freeze-refining of molten aluminum while confined in a rotating cylindrical retort adapted to continuously dissipate heat through the walls thereof to effect deposition of relatively pure aluminum as a dense solid lining on the inner wall surfaces of said retort, the improvements that comprise establishing and maintaining crystallization temperatures at a solid/liquid interface and also maintaining said molten aluminum substantially free of suspended crystals of aluminum, by supplying controlled quantities of heat to said molten aluminum, providing said retort with rear and frontal refractory-lined end-pieces, said frontal end-piece having an opening therein for limited insertion into said retort of a fuel-fired burner, said burner being provided with a deflector element adapted to direct the sensible heat of combustion emanating therefrom principally against the refractory-lined frontal end-piece to effect, in turn, heating of the molten aluminum in contact therewith and to expel gases of combustion out of said retort through the retort opening, and rotating said retort initially in an inclined position with respect to its normal horizontal axis, thereby accumulating said molten aluminum principally against the rear refractory-lined end-piece in limited contact with said heated frontal refractory-lined end-piece, the angle of inclination of said retort being decreased gradually as the refining operation progresses.

13. An improved process for freeze-refining a molten aluminum charge which comprises contacting a molten aluminum charge with a heat-abstracting solid surface maintained in substantially uninterrupted relative motion with respect to said molten aluminum charge, progressively reducing the amount of said molten liquid charge by removing heat through said heat-abstracting surface to cause solidification of aluminum crystals on said heat-abstracting surface while adding heat, directly to said molten charge, in an amount sufficient to prevent accumulation of crystals of aluminum in said molten charge and separating said molten liquid charge, enriched in impurities, from said heat-abstracting surface.

14. In a process for the freeze-refining of a molten aluminum charge to recover a purified solid phase aluminum product and a residual liquid phase enriched in impurities, which includes the steps of contacting the molten aluminum charge with a moving heat-abstracting solid phase to progressively reduce the amount of molten aluminum charge while removing heat from said heat-abstracting solid surface to effect solidification on said heat-abstracting surface under conditions promoting the formation of suspended crystals of aluminum in said residual liquid phase, the improvement whereby a solid phase aluminum product of improved purity is obtained, which comprises adding heat directly to the residual liquid phase in an amount sufficient to suppress the formation of said suspended aluminum crystals in said residual liquid phase but insufficient to melt the solid phase aluminum product from said heat-abstracting surface.

15. In a process for the freeze-refining of molten aluminum to effect recovery of a purified solid phase aluminum product and an impure liquid phase wherein said molten aluminum is moved and maintained in uninterrupted relative motion with respect to a solid aluminum surface through which heat is abstracted from said liquid phase under conditions which would result in the formation of suspended crystals in said liquid phase, the improvement whereby a solid phase aluminum product of improved purity is obtained, which comprises adding heat directly to said liquid phase in an amount sufficient to suppress the formation of suspended crystals in said liquid phase but insufficient to melt the solid aluminum surface through which heat is abstracted.

References Cited by the Examiner

UNITED STATES PATENTS

| | | | |
|---|---|---|---|
| 199,475 | 1/1878 | Seymour | 266—37 |
| 2,087,347 | 7/1937 | Larsen | 22—200 |
| 2,242,350 | 5/1941 | Eldred | 22—200.1 |
| 2,574,764 | 11/1951 | Smalley | 75—61 |
| 2,739,088 | 3/1956 | Pfann | 75—65 |
| 2,773,923 | 12/1956 | Smith | 22—200 |
| 2,822,308 | 2/1958 | Hall | 266—34 |
| 2,848,321 | 8/1958 | Bunbury | 75—68 |
| 2,870,006 | 1/1959 | Morning | 75—10 |
| 2,912,321 | 11/1959 | Brennan | 75—63 |

OTHER REFERENCES

Rhines, Phase Diagrams in Metallurgy, McGraw-Hill Book Co., N.Y., 1956, pages 23–27.

HYLAND BIZOT, *Primary Examiner.*

BENJAMIN HENKIN, *Examiner.*

H. W. CUMMINGS, H. W. TARRING,
*Assistant Examiners.*